(12) United States Patent
Ærtebjerg et al.

(10) Patent No.: US 8,762,359 B2
(45) Date of Patent: Jun. 24, 2014

(54) METHOD OF ANALYZING DATA TRAFFIC IN A TELECOMMUNICATION NETWORK

(75) Inventors: Jens Nikolaj Ærtebjerg, Dubai (AE); Ruben Iversen, København (DK)

(73) Assignee: Neustring FZE (AE)

( * ) Notice: Subject to any disclaimer, the term of this patent is extended or adjusted under 35 U.S.C. 154(b) by 0 days.

(21) Appl. No.: 13/059,325

(22) PCT Filed: Aug. 22, 2008

(86) PCT No.: PCT/DK2008/000298
§ 371 (c)(1),
(2), (4) Date: Apr. 14, 2011

(87) PCT Pub. No.: WO2010/020246
PCT Pub. Date: Feb. 25, 2010

(65) Prior Publication Data
US 2011/0184961 A1    Jul. 28, 2011

(51) Int. Cl.
*G06F 17/30* (2006.01)

(52) U.S. Cl.
USPC ............................ 707/706; 707/802; 379/133

(58) Field of Classification Search
USPC ............ 707/706, 802–803; 709/206; 379/133
See application file for complete search history.

(56) References Cited

U.S. PATENT DOCUMENTS

| | | | |
|---|---|---|---|
| 5,220,593 A * | 6/1993 | Zicker et al. | 455/407 |
| 6,252,946 B1 * | 6/2001 | Glowny et al. | 379/88.22 |
| 6,298,123 B1 | 10/2001 | Nolting | |
| 6,744,866 B1 * | 6/2004 | Nolting et al. | 379/133 |
| 6,891,938 B1 * | 5/2005 | Scott et al. | 379/112.06 |
| 7,031,697 B2 * | 4/2006 | Yang et al. | 455/414.1 |
| 7,197,123 B1 * | 3/2007 | Gilbert | 379/142.01 |
| 2001/0055372 A1 * | 12/2001 | Glowny et al. | 379/88.22 |
| 2004/0107205 A1 * | 6/2004 | Burdick et al. | 707/102 |
| 2005/0216421 A1 * | 9/2005 | Barry et al. | 705/64 |
| 2006/0221941 A1 * | 10/2006 | Kishinsky et al. | 370/352 |
| 2007/0026886 A1 * | 2/2007 | Vincent | 455/522 |
| 2008/0071733 A1 * | 3/2008 | Shadmon et al. | 707/2 |
| 2008/0080372 A1 | 4/2008 | Cai | |
| 2009/0187550 A1 * | 7/2009 | Mowatt et al. | 707/5 |
| 2009/0235267 A1 * | 9/2009 | McKinney et al. | 718/104 |
| 2010/0146063 A1 * | 6/2010 | Lidin et al. | 709/206 |

FOREIGN PATENT DOCUMENTS

| | | |
|---|---|---|
| EP | 1804479 A1 | 7/2007 |
| WO | 0120920 A1 | 3/2001 |
| WO | 0163530 A1 | 8/2001 |

OTHER PUBLICATIONS

International Search Report PCT/DK2008/000298; Dated Jun. 18, 2009.

* cited by examiner

*Primary Examiner* — Hanh Thai
(74) *Attorney, Agent, or Firm* — Cantor Colburn LLP

(57) ABSTRACT

The invention relates to a method of analyzing data traffic in at least one telecommunication network, said method comprising the steps of: achieving a plurality of call detail records related to said data traffic in said at least one telecommunication network, aggregating the plurality of call detail records into a call detail record representation comprising at least one pre-search results and storing said call detail record representation in a database, and performing an analysis of said data traffic by means of a query in said call detail record representation.

20 Claims, 8 Drawing Sheets

METHOD OF ANALYZING DATA TRAFFIC IN A TELECOMMUNICATION NETWORK

FIELD OF INVENTION

Figure 1:
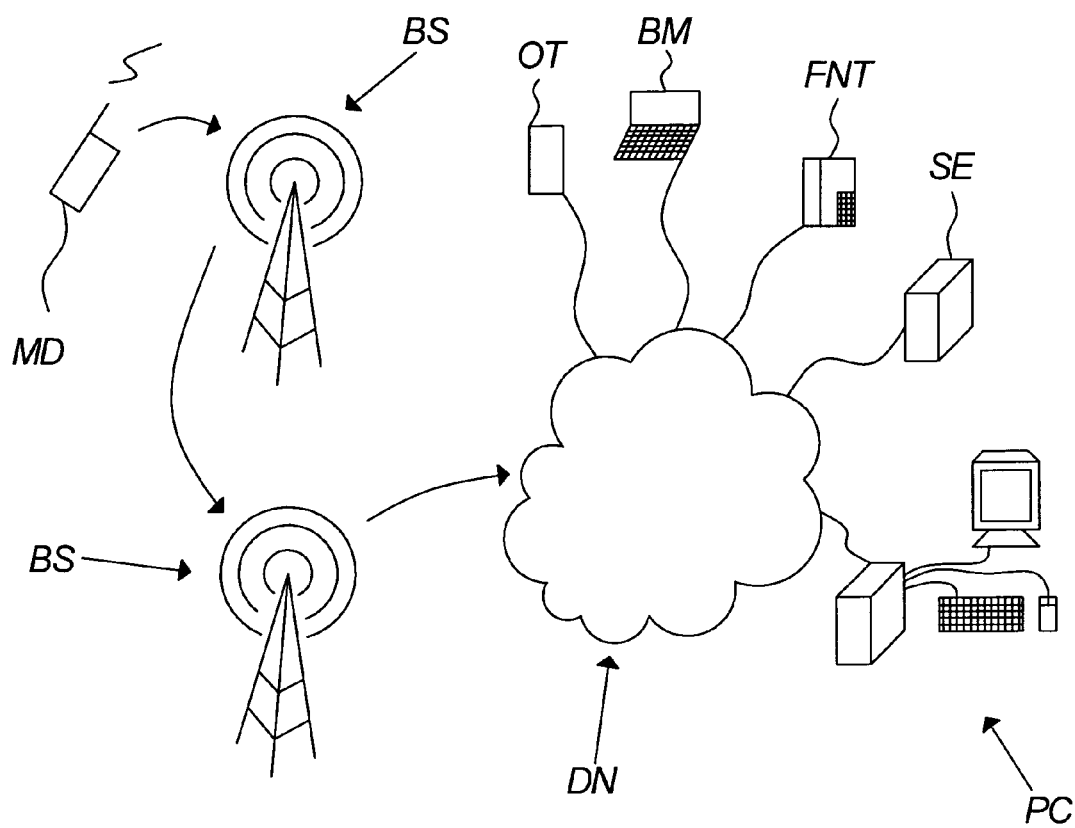

Method of analyzing data traffic in at least one telecommunication network.

SUMMARY OF THE INVENTION

The invention relates to a method of analyzing data traffic in at least one telecommunication network (TN), said method comprising the steps of:
- achieving a plurality of call detail records (CDR) related to said data traffic in said at least one telecommunication network (TN),
- aggregating (AG) the plurality of call detail records (CDR) into a call detail record representation (CDRR) comprising at least one pre-search result (PSR) and storing said call detail record representation (CDRR) in a database, and
- performing an analysis of said data traffic by means of a query in said call detail record representation (CDRR).

In an advantageous embodiment of the invention, the method enables the user e.g. a network operator to perform an analysis of real historical data from a plurality of call events. Such analysis may be used to optimize the pricing of call events, billing of subscribers or to predict the routing of data.

In a further advantageous embodiment of the invention, the result of the analysis is available for the user of the present invention via a query application. The user may through the query application initiate different simulations based on the historical call event data from a plurality of call detail records. When a call event is made from a mobile device, laptop or other kind of communication device all the call-related data related to the call event is obtained in a call detail record, also sometimes referred to as an event detail record.

In a further advantageous embodiment the user may apply input to the historical call event data to simulate changes e.g. in revenue or data traffic (TAP (TAP; Transferred Account Procedure)/CDR (CDR; Call Detail Record) traffic) routing between networks.

In a further advantageous embodiment of the invention, such input may e.g. be the price for one second or one byte of data traffic, changing in the zoning of countries, discounts to different subscriber groups e.g. employees in a company having a subscription to the same operator, etc.

In a further advantageous embodiment of the invention, the user may be an operator of a telecommunication network having subscribers using roaming partners' telecommunication network (referred to as outbound roaming) or roaming partners' subscribers using their own telecommunication network (referred to as inbound roaming).

In a further advantageous embodiment of the invention, the method of the present invention is used to make, simulate and/or determine a pricing model, which may include the tariff a subscriber is charged for using different services.

In a further advantageous embodiment of the invention, at least one pre-search result is used to give a picture of the data traffic in a telecommunication network or between at least two telecommunication networks. This picture may e.g. be used as basis for negotiations if e.g. the picture shows that a majority of subscribers are using a specific telecommunication network this may be used as arguments for obtaining better discounts from the operator of that telecommunication network.

In a preferred embodiment of the invention, the analysis of data in a least one telecommunication network comprises an analysis of data traffic to and/or from the at least one telecommunication network and/or analysis of data traffic between at least two different networks.

The invention may in an advantageous embodiment be applied in predictive pricing and analysis tools used in relation to roaming of call events and exchange of data traffic between data communication networks.

In an embodiment of the invention, said aggregation is performed on the basis of a subset of fields of said call detail records.

In an advantageous embodiment of the invention, the aggregation is based on call-related data which may be found in a call detail record or event detail record. It is very advantageous to find the call-related data in the call detail record because the call detail record is sent to the network operator from different roaming partners. Hence, in an embodiment of the invention, no actions should be taken from the user to receive these call-related data.

Aggregation may be interpreted as an advanced counting of call events. Hence, aggregating a set of call-related data may result in a list where a number of call events have the same value in the same fields or a number of call events is interpreted to be the same type. A value may e.g. be a destination country, duration of a call event or any value that may be extracted from a call detail record directly or indirectly.

One example could be aggregating 5000 call events resulting in a list having Germany as destination country and 1000 as the number of calls made to Germany and France as destination countries and 500 as the number of calls made to France, etc. Hence, the aggregation may be considered to create a relation between call events with reference to one or more values or interpretations thereof of a group of call events, typically represented by a number of call detail records.

An aggregation may also be regarded as a kind of quantisation in the sense that the aggregation may most likely result in that information is lost. However, in order to facilitate a fast response to a query such "loss of information" may be accepted and it has moreover been realized that simplified aggregations may in fact fully facilitate fast reply to even relatively complex queries.

In a further advantageous embodiment of the invention, only e.g. 20-30 of the fields in a call detail record may be used to minimize the requirements to the data processing apparatus of the present invention.

In a further advantageous embodiment of the invention, the numbers of fields are determined on basis of the speed of the processing of data in the present invention.

In a further advantageous embodiment of the invention, the numbers of fields are determined on basis of what analysis results the user would require.

In an embodiment of the invention, said aggregation is performed on the basis of a transfer file.

In an advantageous embodiment of the invention, the transfer file comprises at least some of the call-related data which are recorded by the operator of the public mobile network where the subscriber of the user of the system is e.g. performing a voice call.

In a further advantageous embodiment of the invention, the transfer file may e.g. be a TAP file or a CIBER (CIBER; cellular intercarrier billing exchange roamer) file or any other format used for transferring call/event related data. Furthermore, the present invention may operate with more than one version of e.g. the TAP file or the CIBER file.

In a further advantageous embodiment the transfer file is routed between network operators by a data clearing house or by the network operators themselves.

In a further advantageous embodiment of the invention, the call detail records comprised in the transfer file each comprises more than 200 fields of call-related data.

In an embodiment of the invention, said aggregation is performed on the basis of a subset of fields represented in a transfer file.

In an embodiment of the invention, said aggregation results in at least one pre-search result.

In an advantageous embodiment of the invention, the pre-search results are stored e.g. in a memory or in any type of database. It may also be advantageous that the results of the aggregation are indexed so that the results are easy accessible.

In an embodiment of the invention, at least one of said pre-search results comprises summation established with reference to at least one field of said call detail record.

In an advantageous embodiment of the invention, the pre-search results comprising a summation of individual call events which have at least one common denominator. Hence, all call events e.g. from Germany may be summarized in one pre-search result together with similar summations of call events from other countries.

In a further advantageous embodiment of the invention, the pre-search results summarize e.g. duration of call events, origination or destinations of call events, roamed networks, call events from unique subscribers, etc.

In a further advantageous embodiment of the invention, the number of pre-search results depends on the demands from the user to the present invention. Such demands could e.g. be the speed of the data processing, flexibility such as e.g. the scope of different results presented by the present invention, etc.

The pre-search results may advantageously comprise an indexed summation.

In an embodiment of the invention, said query is performed with reference to said summation of said pre-search results.

In an embodiment of the invention, the response to a query made e.g. by the user may be presented to the user by means of processing some of the summations present in the pre-search results.

In a further advantageous embodiment of the invention, the response to a query made e.g. by the user may be presented to the user by means of processing some of the summations present in the pre-search results together with some of the input made e.g. by the user.

In a further advantageous embodiment of the invention, the query is performed from a query application.

In an embodiment of the invention, said summation comprises an at least partly overlapping description of said call detail record.

In an advantageous embodiment of the invention, the pre-search results comprise a summation of individual call events which has at least one common denominator. Hence, call-related data from individual call events may be present in a plurality of different summations within the same pre-search result and furthermore call-related data from individual call events may also be present in more than one pre-search result.

In an embodiment of the invention, said method comprising B-number normalization.

In an advantageous embodiment of the invention, a B-number normalization is performed. The B-number normalization is performed to obtain a uniform representation of the destination of call events in the analysis of an embodiment of the present invention. The B-number represents e.g. in which country the called party has his subscription, the B-number is the called parties number e.g. telephone number.

In an embodiment of the invention, said method can be used separately or in connection the existing systems.

In an advantageous embodiment the present invention is executed in relation to a stand-alone data processor/application which may not even be in connection with other control or data traffic steering systems used by the user of the present invention. In an embodiment, the present invention has to receive call-related data from one other systems (e.g. via a portable storage device), but when the present invention has obtained these call-related data the present invention may perform analysis without being connected to any other systems.

In a further advantageous embodiment of the present invention, the present invention may be executed as a connected application. Hence, the present invention may e.g. be placed on a server to which a user connects and the data necessary for the present invention to analyze the user's data traffic is obtained by the mentioned connection.

In an embodiment of the invention, said aggregation forms a model of the data traffic in at least one telecommunication network.

According an advantageous embodiment of the invention, it doesn't necessarily matter whether the model is complete and describes every feature of the traffic represented by the call detail records as long as the model may be formed on the basis of pre-search results that are sufficient to the requirements of the user.

In an embodiment of the invention, said analysis is performed on data traffic between at least two different telecommunication networks.

In an advantageous embodiment of the invention, analysis of call events in one telecommunication network, especially when a network operator is analyzing its own public mobile network, may be relatively simple in comparison to analyzing call events between two different public mobile networks operated by different mobile operators.

In an advantageous embodiment of the invention, analysis of call-related data related to call events between two public mobile networks may be facilitated. This analysis may e.g. be facilitated when the call event occurs between two public mobile networks operated by the same mobile network operators or operated by two different mobile operators. Furthermore, the analysis may both be facilitated in relation to inbound and outbound roaming.

The analysis is typically based on data describing the data traffic between two or more telecommunication networks and such data may typically be established and provided by data clearing houses or be directly exchanged between mobile operators.

In an embodiment of the invention, said aggregation forms a model of the data traffic in at least one telecommunication network and wherein said model may be modified.

In an advantageous embodiment of the invention, the model is a historical more or less exact picture of data traffic, e.g. all call events from the subscribers of one network operator which may be analyzed by means of a query in the data traffic picture. Typically, such data traffic would also relate to data traffic which has been handled by other operators. An embodiment of the present invention allows the user to modify the model or picture e.g. by inputting new parameters thereby e.g. emulating an increase in the amount of data traffic, changing existing parameters e.g. call-related data, applying events e.g. a discount or a world wide happening such as the Olympic Games.

In a further advantageous embodiment of the invention, the aggregation forms a model of data traffic between at least two telecommunication networks and wherein this model may be modified. One example of modifying a model could be increasing the tariff the subscribers have to pay by 5% with respect to certain calls. This could be used by the user of the present invention to simulate the increase in revenue with respect to these calls and thereby on the basis of a very complex picture of the data traffic. Moreover, it would be possible to incorporate e.g. an expected increase of data traffic related to a specified country and a decrease of data traffic to another region.

It should be noted that such a modification of a model is relying on the result of one or more aggregations being available as a modification based on raw call detail records representations in reality with state-of-the-art data processing equipment would be virtually impossible when dealing with typically several terra bytes of data.

In a further advantageous embodiment of the invention, the model is a historical picture of data traffic which may be very accurate. This may be advantageous if a user requires a model of the data traffic with a high accuracy.

In an embodiment of the invention, said model is modified by an arithmetic or combinational modification of said pre-search results based on user inputs interfaced as a query in said call detail representation.

In an advantageous embodiment of the invention, a user may perform a further manipulation of the already established pre-search results e.g. by a combinational modification of the pre-search results e.g. in the form of zoning, where traffic to and from certain areas or countries are combined into a single zone.

In a further advantageous embodiment of the invention, a user may perform a further manipulation of the already established pre-search results e.g. by an arithmetic modification of the pre-search results e.g. in the form of a modified pricing to emulate e.g. what the overall result of a change of tariffs would be.

In an embodiment of the invention, said model comprises pre-stored data.

In an advantageous embodiment of the invention, the present invention has pre-stored data which is used in the analysis or calculations on the call-related data. Such pre-stored data may e.g. be call-related data from different countries, different price models or user specific data such as subscription details which are comprised in all or groups of subscriptions.

In a further advantageous embodiment of the invention, the model of the present invention generates, without any further actions from the user, needed data to complete an analysis. If e.g. no call events have been made from a country in one origination zone the model may generate a 0 or another value depending on which analysis or calculation the model is to perform.

In a further advantageous embodiment of the invention, the model of the present invention is adapted for receiving input from the user and use this input e.g. in the analysis or calculations. Furthermore, input from a user may also be used to manipulate the finished analysis results, e.g. if a user would like to calculate the revenue of all video call events, if the number of video call events were increased e.g. by 8%.

In an embodiment of the invention, the results of a query are presented to the user real time.

In an advantageous embodiment of the invention, a query may simply be inputting e.g. a new country into a zone of countries or inputting the charge of one second of a voice call event. Hence, when the curser is moved from an input field, e.g. comprised in a graphical user interface of an input module, the result of the effect of the input is displayed to the user. In another embodiment of the invention, when the mouse pointer lets go of a sliding bar, the result of the effect of the input is displayed to the user. This real time displaying of results can be done because of the aggregations performed on the call-related data.

In a further advantageous embodiment of the invention, the result of a query may not be found in the aggregated call-related data. Then the result of a query may not be real time presented to the user because it is necessary to go through not aggregated call-related data to answer the query. This not aggregated call-related data may be a relatively large amount of data which may be time consuming to go through.

In an embodiment of the invention, the user of the method may input data to be utilized for said query.

In an advantageous embodiment of the invention, the user may apply data to the method so the data inputted from the user may be used in the analysis or to perform calculations on the analysis results.

In a further advantageous embodiment of the invention, the input of data is performed from a query application.

In an embodiment of the invention, a pre-search comprises filtering of call-related data from the call detail record of the transfer file.

In an advantageous embodiment of the invention, the method comprises a filtering of call-related data so that the aggregation only is performed on a subset of fields. The fields may in an embodiment be the same as the value between two separators in a line of text, binary or any other representation of data. This filtering may be very advantageous since it reduces the amount of call-related data to process. Hence, both the physical media for storing and the processing time are reduced.

In a further embodiment of the invention, the filtering of call-related data includes selecting some fields of data and discharging the rest, understood in the way that the discharged data simply are kept in a database and the filtered data are used in the aggregation.

In a further embodiment of the invention, the filtering may be performed in relation to the aggregation. Hence, the aggregation includes a filtering of the call-related data.

In an embodiment of the invention, the modifications are made on the basis of the already established pre-search results.

In an embodiment of the invention, the modifications are made at least partly on the basis of new pre-search results.

In an embodiment of the invention, said aggregation is a base aggregation.

In an advantageous embodiment of the invention, the base aggregation performs a summation of call events made e.g. within a specific month, within a specific year, to a specific country, etc. Hence, at least one pre-search result is provided which facilitates real time response to a query from the user.

In an advantageous embodiment of the invention, the base aggregation is basically a count of call events having common value in the same fields. The counting of call events are made based on frames provided by the user or developer of the present invention. Changes in these frames require at least partly a new base aggregation.

In an embodiment of the invention, said aggregation is a time band aggregation.

In an advantageous embodiment of the invention, the time band aggregation performs a summation of call events made e.g. within the same period of the day. Hence, at least one pre-search result is provided which facilitates real time response to a query from the user.

In an embodiment of the invention, said aggregation is a key figure aggregation.

In an advantageous embodiment of the invention, the key figure aggregation performs a summation of e.g. the number of unique subscribers performing call events. Hence, at least one pre-search result is provided which facilitates real time response to a query from the user.

In an embodiment of the invention, said aggregation is a tariff plan aggregation.

In an advantageous embodiment of the invention, the tariff plan aggregation performs a summation of different combinations of call events e.g. originating from the same country. Hence, at least one pre-search result is provided which facilitates real time response to a query from the user. Furthermore, the tariff plan aggregation may be understood as an additional aggregation on top of results of the above-mentioned aggregations.

In an embodiment of the invention, said aggregation is an analysis aggregation.

In an embodiment of the invention, the result of said aggregations is pre-search results, wherein said pre-search results are further aggregated.

In an advantageous embodiment of the invention, more than one aggregation is performed. An advantage of such layered aggregation is that the first layer of aggregation may be technical very difficult to perform, but then the additional layer of aggregation may be more easy to conduct. The additional layer or layers of aggregation may not be that complicated to understand and e.g. be carried out by the user of the present invention. Since the additional layer or layers of aggregation is simpler than the first layer of aggregation, the additional aggregation(s) may be executed real time.

In an advantageous embodiment of the invention, an example of a first aggregation could be aggregating all call detail records e.g. resulting in a description of the data traffic to Italy. The additional layer of aggregation then e.g. based on input from the user aggregates the results of the first aggregation to analyze the data traffic to Italy. This additional aggregation is very fast since it should only aggregate the result of the first aggregation and does not have to start going through all call detail records to unscramble data traffic to Italy.

In an embodiment of the invention, the first layer of aggregation performs results in multiple areas, not only related to countries but e.g. also related to call event type, time of day, duration, etc. to optimize the analysis performed by the additional aggregation.

In an advantageous embodiment of the invention, the result of to aggregation of the result of the first aggregations are present as output from the present invention to the user.

In an embodiment of the invention, the result of said aggregations is pre-search results, and wherein said pre-search results in combination with further aggregation(s) and/or input from a user delivers an output to the user.

In an advantageous embodiment of the invention, the output may be presented visually e.g. on a screen or in a hard copy from a printer. The output may be presented as graphs, charts, geometrical figures, text, numbers, etc.

In a further advantageous embodiment of the invention, the result of the aggregations combined with a further aggregation and/or input from the user gives the user opportunity to modify the data traffic e.g. produce a forecast of future revenue or billing strategies.

In an embodiment of the invention, said aggregation includes the duration of a call event.

In an advantageous embodiment of the invention, the aggregation performs a summation on the duration of a call event which is found as part of the call-related data received from roaming partners. In one embodiment of the present invention, this may be used to find the most optimal charge of subscribers roamed call event. The duration may e.g. be measured in seconds (e.g. voice call), bytes (e.g. GPRS (GPRS; General Packet Radio Service) sessions), numbers (SMS (SMS; Short Message Service) call events), etc.

In an embodiment of the invention, said aggregation includes International Mobile Subscriber Identity number for the calling party of a call event.

In an advantageous embodiment of the invention, the aggregation performs a summation on the number on individual IMSI (IMSI; International Mobile Subscriber Identity) numbers performing call events. The IMSI number is found as part of the call-related data received from roaming partners. It may be advantageous to be able to locate the number of call events from one specific subscriber in order to e.g. offer special discounts to individual or groups of subscribers.

In an embodiment of the invention, said aggregation includes the origination of at least one call event.

In an advantageous embodiment of the invention, the aggregation performs a summation on the number of call events originating from different countries. The originating country of a call event is found as part of the call-related data received from roaming partners. It may be advantageous to be able to have the total number of call events originating e.g. from the Scandinavian countries if e.g. a common discount for subscribers from any of the Scandinavian countries are calling from countries outside Scandinavia is to be negotiated.

In an embodiment of the invention, said aggregation includes the destination of at least one call event.

In an advantageous embodiment of the invention, the aggregation performs a summation on the number of call events terminated in different countries. The termination country of a call event is found as part of the call-related data received from roaming partners. It may be advantageous to be able to have the total number of call events terminating e.g. in a specific public mobile network in a given country to be able to calculate the revenue of call events related to the network operator operating this specific public mobile network. The revenue may e.g. cover both the profit for the network operator and the amount the subscriber has to be charged.

In an embodiment of the invention, the method is computer-implemented.

In an embodiment of the invention, the computer-implemented method is operated on the basis of input of a user.

The input of a user may e.g. be established by means of keyboards, data files or any suitable input interfacing methods adapted to communicate with a computer implemented solution of the present invention according to the requirements of the user.

In an embodiment of the invention, at least part of the pre-search results is displayed to a user.

In an advantageous embodiment of the invention, e.g. the total number of call events made to Russia is displayed to the user. This gives the user, e.g. a network operator, an overview of the distribution of his subscribers' call event patterns which may be used in relation to marketing or for planning/design of future subscriptions.

In a further advantageous embodiment of the invention, the output is displayed from a query application.

In an embodiment of the invention, the result of a query or input is displayed to a user.

In an advantageous embodiment of the invention, the result of a query is displayed to the user of the system, giving the user a fast response and thereby leaving a user-friendly impression of the invention.

In an advantageous embodiment of the invention, the result of a input is displayed to the user of the system, giving the user a possibility to monitor the effect of the input which e.g. could determine a revenue related to a specific public mobile network and then the present invention may suggest and display a price model which results in the determined revenue. A further input could be increasing the amount of call events to a given country with 5% and then display the effect of the input to the user.

In an advantageous embodiment of the invention, the user may specify desired revenue and the present invention may suggest at least one way of manipulating or changing one or more tariffs to achieve the desired revenue.

In an advantageous embodiment of the invention, the result of an additional aggregation e.g. the tariff plan aggregation is displayed to the user.

In an embodiment of the invention, the result of a query is displayed to the user by means of numbers, charts, graphs, maps or any other visual displaying effects.

In an advantageous embodiment of the invention, the result of a query or input is displayed to the user of the system in a form adapted to e.g. the user or adapted to the result which is going to be displayed. In an advantageous embodiment of the invention, the results e.g. total numbers of call events from different countries are displayed as a number on the country on a map of the world. In another advantageous embodiment of the invention, the result, e.g. the revenue from the last year is divided into the individual month and a graph illustrates the monthly revenue.

In an embodiment of the invention, the result of a query or input is interfaced to a user by means of a data file.

The invention also relates to a computer-implemented method of analyzing data traffic in at least one telecommunication network, said method comprising the steps of:
- a computer achieving a plurality of call detail records related to said data traffic in said at least one telecommunication network,
- aggregating the plurality of call detail records into a call detail record representation comprising at least one pre-search results and storing said call detail record representation in a computer readable database and facilitating,
- an analysis of said data traffic by means of a query in said call detail record representation interfaced to said computer.

In an embodiment of the invention, said computer-implemented method is performed.

Likewise the invention relates to a method of forecasting roamed data traffic in a telecommunication network.

In an advantageous embodiment of the invention, the forecasting of the data traffic may be used as basis for steering the data traffic to specific networks or network operators.

In an embodiment of the invention, said method of forecasting roamed data includes an association of data traffic tariffs to said call detail representation.

THE FIGURES

Figure 2A:
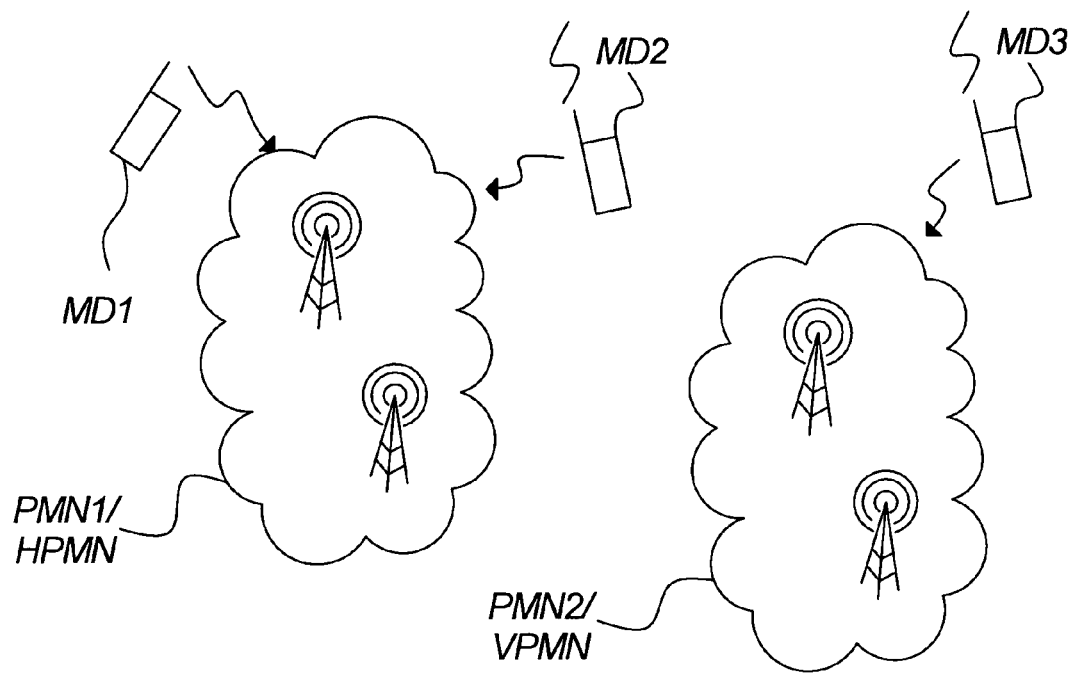
Figure 2B:
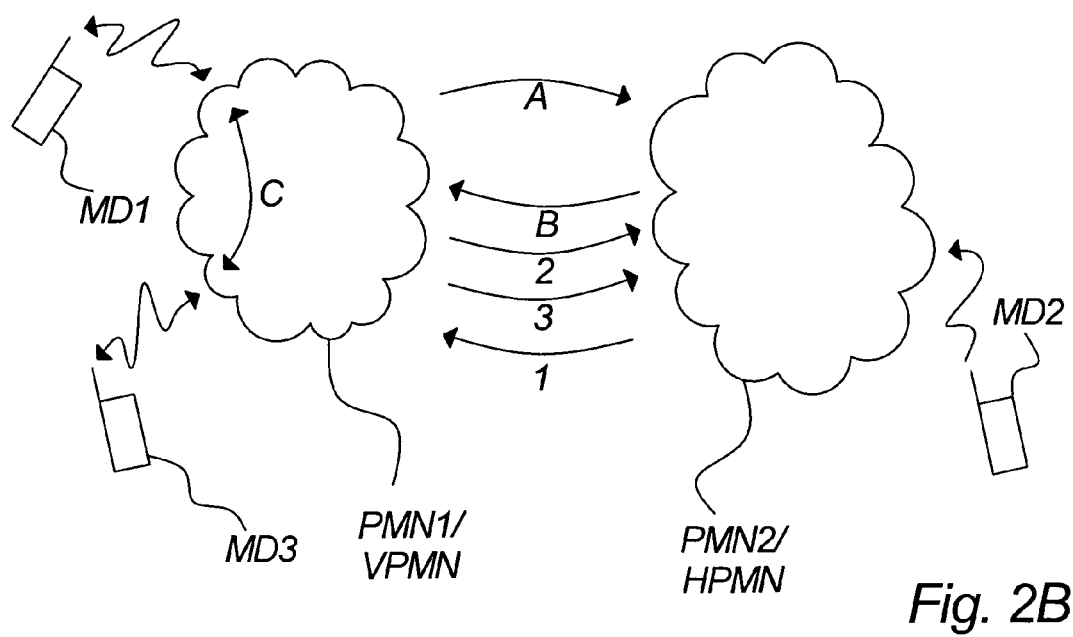
Figure 3:
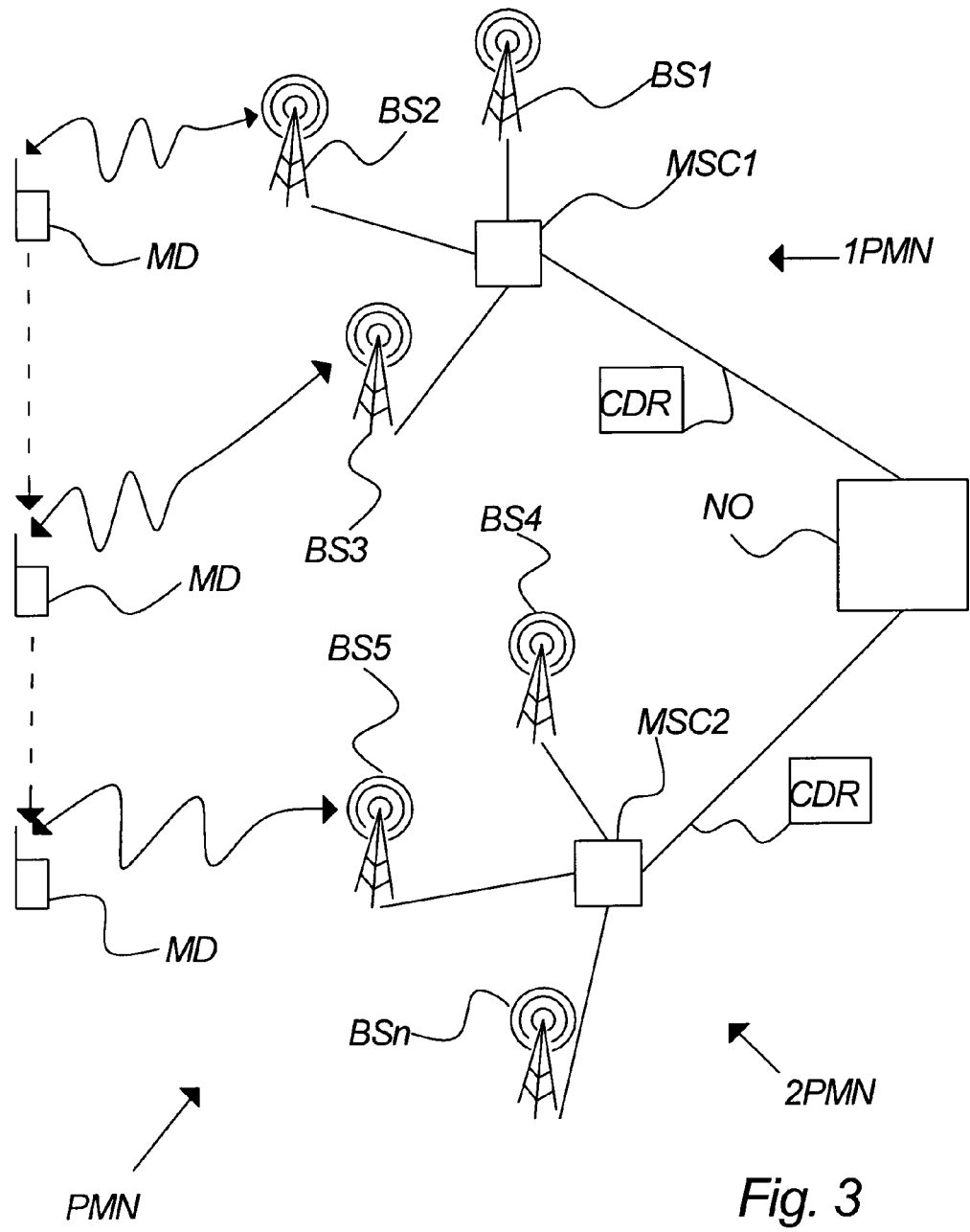
Figure 4:
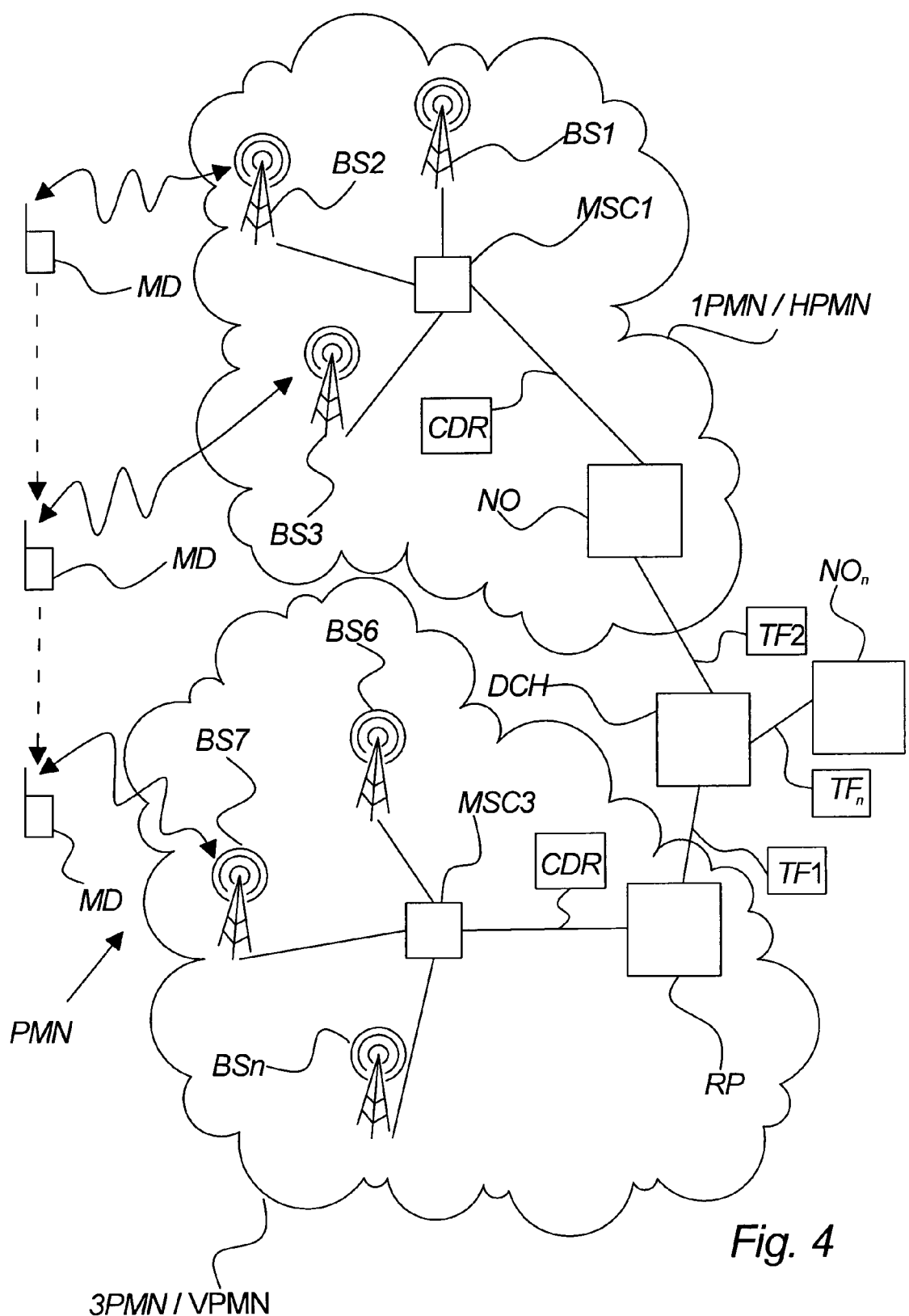
Figure 5:
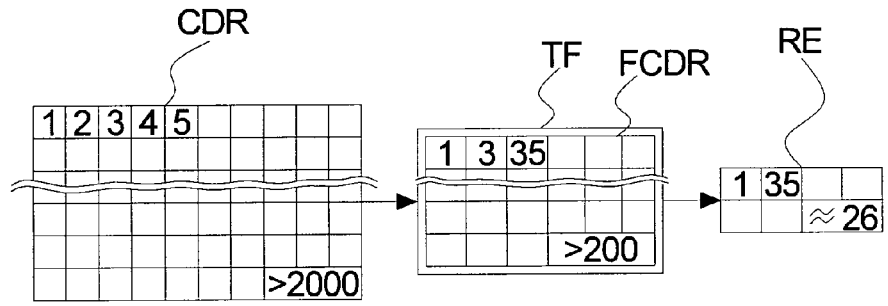
Figure 6:
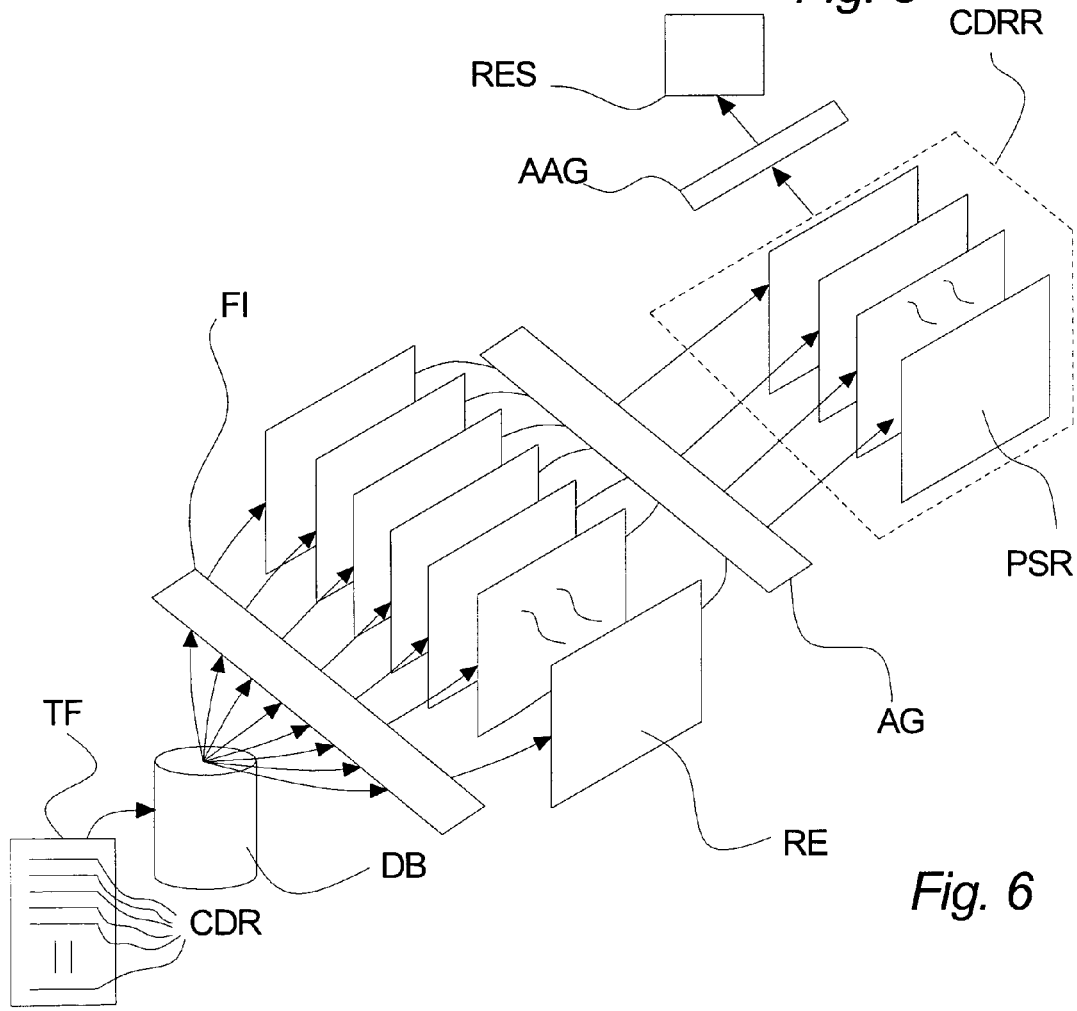
Figure 7:
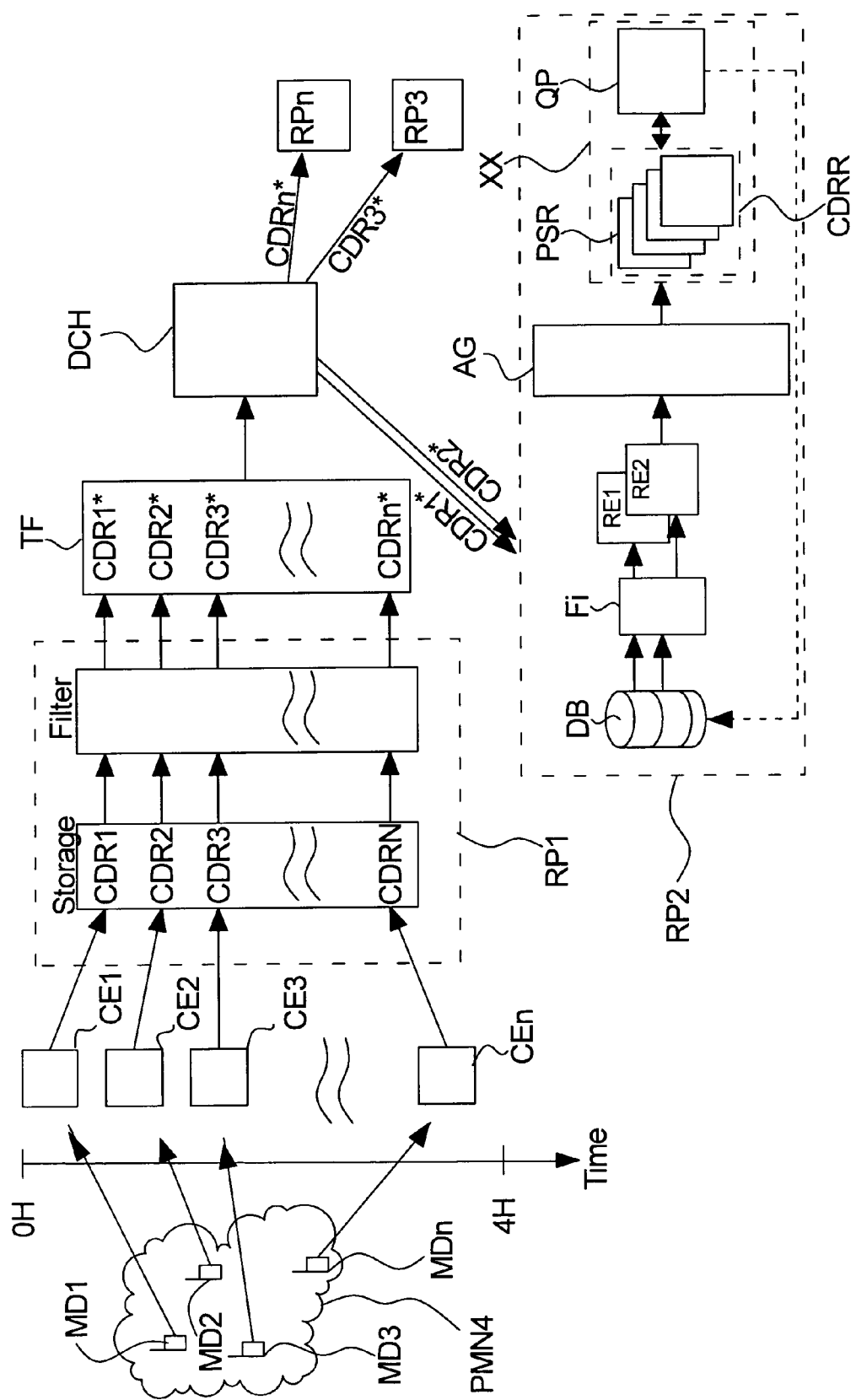
Figure 8:
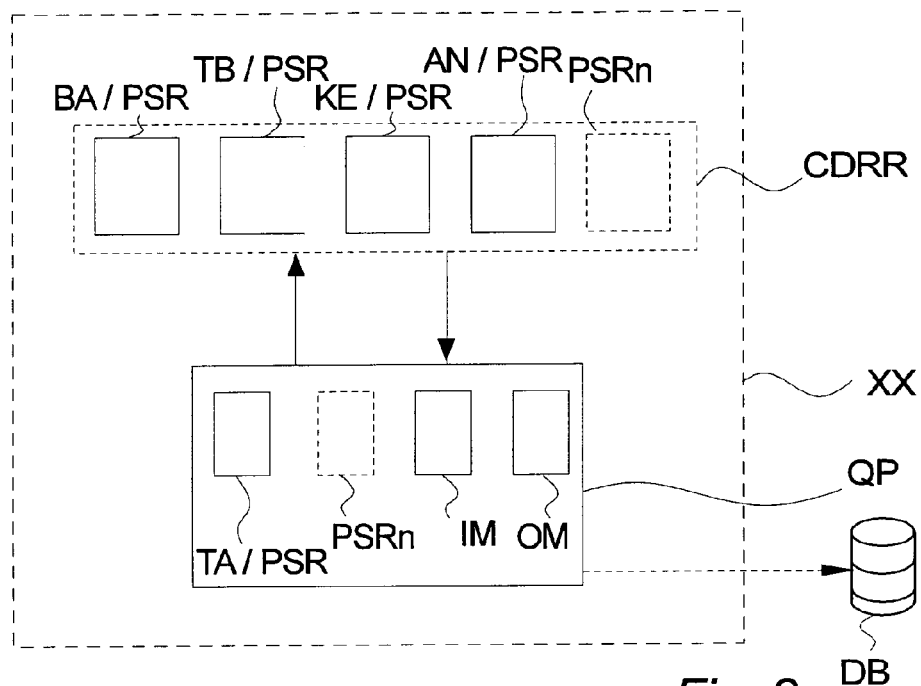
Figure 9:
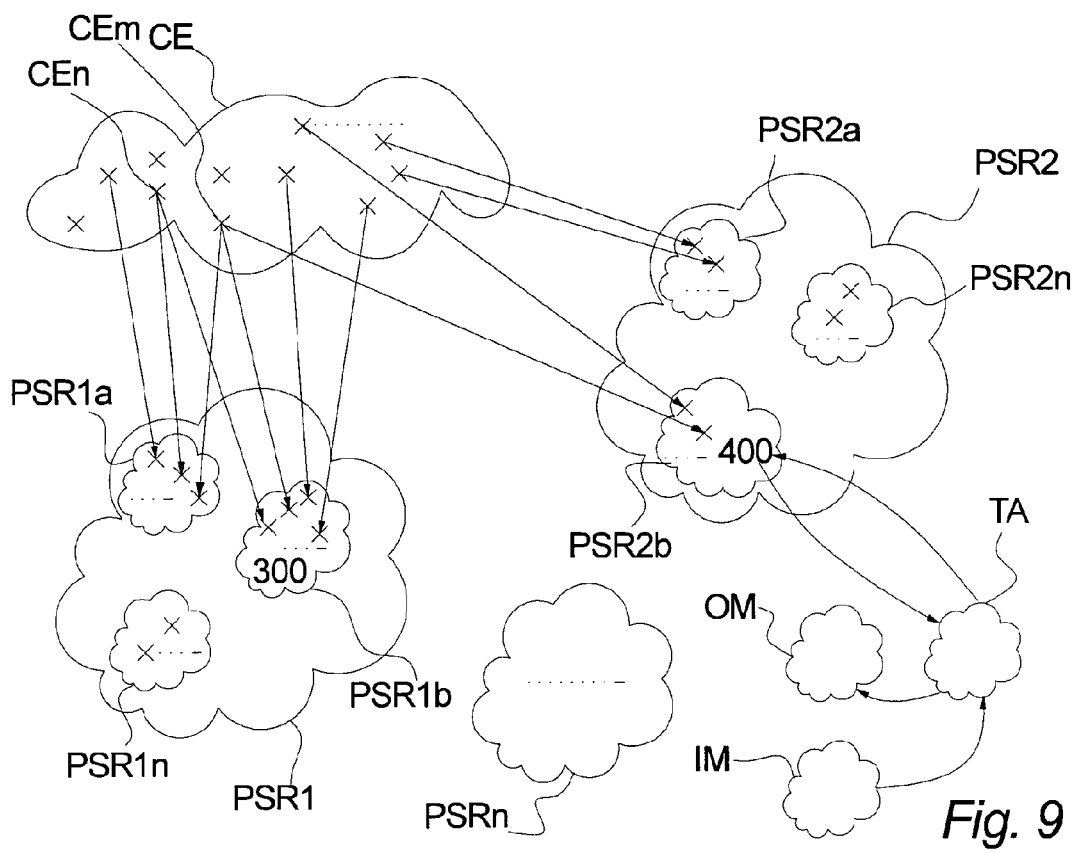
Figure 10:
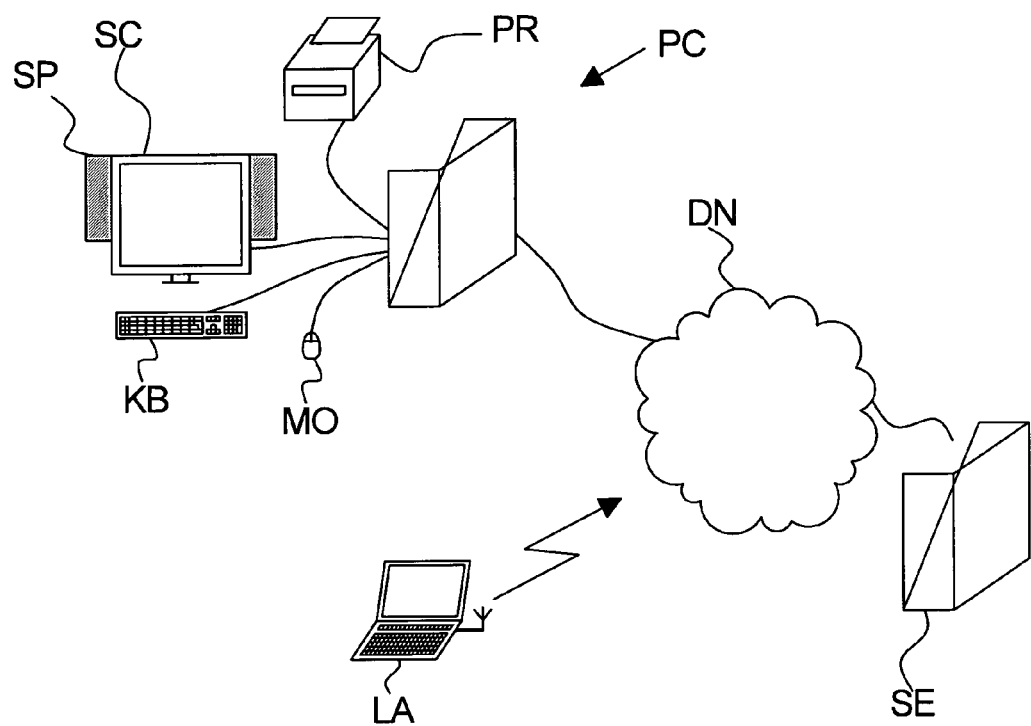

The invention will now be described with reference to the detailed description where:

FIG. 1 illustrates a data network,

FIGS. 2A and 2B illustrate mobile communication in and between public mobile networks, FIG. 3 illustrates an overview of communication in a public mobile network operated by the same network operator, FIG. 4 illustrates an overview of communication in a roamed public mobile network, FIG. 5 illustrates call-related data in three different degrees of details, FIG. 6 illustrates an overview of how call-related data is processed in an embodiment of the present invention, FIG. 7 illustrates an overview of a telecommunication network including an embodiment of the present invention, FIG. 8 illustrates a more detailed overview of an embodiment of the present invention, FIG. 9 illustrates an example of aggregation of call events and where FIG. 10 illustrates hardware adapted to be used in relation to an embodiment the present invention.

DETAILED DESCRIPTION

FIG. 1 illustrates an overview of a data network DN. A mobile device MD, such as a mobile telephone, personal digital assistant, laptop or any other wireless device may be wireless connected to one or more Base Stations BS which again wireless or by means of cable is connected to the data network DN. Devices such as a laptop LA, fixed network telephone FNT, server SE, computer PC or any other devise adapted to communicate through a network such as e.g. PDA (PDA; Portable Digital Assistant), portable gaming devices, media centers, etc. may also be connected to the data network DN.

The data network DN enables two or more devices connected to the data network DN to communicate. More than one data network may be connected to each other enabling data traffic over a large geographical area (e.g. through extra-, intra- or internet) and through satellites, the universe may be reached by data from a data network DN.

Data traffic may be understood e.g. as a voice or video call, text, picture or audio transfer or simply communication or transferring data between a mobile device and a network such as e.g. a public mobile network PMN or the internet. This may include the direct connection between two mobile devices through the data network DN. Today data traffic as described is used to a great extent and it is problematic to access and handle such huge amount of data, efficient enough to perform real time analysis of the data traffic.

In general, two different main categories of data traffic, also referred to as call event occurs. In the first category, which e.g. covers voice and video call, the call event traffic session is open as long as e.g. a voice call is ongoing, hence, the duration of such a call event can be measured e.g. in seconds. In the second category, which e.g. covers browsing the internet from a mobile device, the call event traffic session also referred to as data traffic session is open from the time the user connects e.g. to the internet and until the user again disconnects from the internet. This may also include e.g. intra or extranet services, such as the email service Blackberry. Even though the duration of such data traffic session may be one whole day, the user may only perform one search and hence only download data once during this whole day. Hence, the duration of a data traffic session of the second category can be measured by measuring the amount of data which is transferred, e.g. how many bytes of data were downloaded from the internet. In relation to the description in this document, a call event traffic session may also be referred to as a call event.

Besides these two main categories of data traffic there may be other services such as e.g. SMS and USSD (USSD; Unstructured Supplementary Service Data) which is measured apiece.

In a preferred embodiment of the invention, the data network DN is a telecommunication network such as e.g. a GSM (GSM; Global System for Mobile communication) or CDMA (CDMA; Code Division Multiple Access) network or the like. The data network DN comprises at least one mobile network having a plurality of base stations BS. In this document when using the term public mobile network PMN it refers to a data network DN or telecommunication network as described above.

An embodiment of the present invention relates to a method of analyzing data traffic in a data network, preferably in a public mobile network PMN or between at least two different public mobile networks PMN. The analyzing result may then be used in preparation for pricing or steering of call event traffic sessions or forecasting the effect from changing one or more parameters related to communication from mobile devices MD, etc.

FIG. 2A illustrates two public mobile networks PMN1 and PMN2 operated by two different network operators. A network operator may also be referred to as mobile operators or mobile network operator. In this first example the two public mobile networks PMN1 and PMN2 cover the same geographical area but have competing network operators such as TDC and TELIA in Denmark.

If two subscribers to the same network operator are communicating (e.g. calling each other through MD1 and MD2) within their home public mobile network HPMN their network operator defines the tariff for the call on his own.

A home public mobile network HPMN is to a subscriber the network operated by the network operator to which the subscriber has a subscription. On FIG. 2A this corresponds to the situation where the two subscribers with MD1 (subscriber 1) and MD2 (subscriber 2) both have a subscription to the network operator operating the public mobile network PMN1. Hence, when subscriber 1 calls subscriber 2 within public mobile network PMN1, subscriber 1 and 2 are communicating within their home public mobile network HPMN.

Another scenario illustrated on FIG. 2A is where subscriber 1 from his home public mobile network HPMN (public mobile network PMN1) calls subscriber 3 on mobile device MD3. Subscriber 3 has a subscription with the operator of public mobile network PMN2; hence, public mobile network PMN2 is subscriber 3's home public mobile network HPMN.

In this situation the tariff of the call between public mobile networks PMN1 and PMN2 is based on negotiations between the two network operators operating public mobile network PMN1 and PMN2.

FIG. 2B illustrates the situation where a subscriber is calling from a network which is not his home public mobile network HPMN. In this situation the network from which the subscriber is starting his call is named visited public mobile network VPMN. This situation occurs e.g. if a mobile subscriber is going on vacation to another country. When the subscriber leaves his own country he may also leave the geographical area covered by his home public mobile network HPMN and if he is using his mobile telephone during his vacation outside his home public mobile network HPMN he is using a visited public mobile network VPMN.

This is illustrated by the following example with reference to FIG. 2B. A first subscriber with mobile device MD1 is e.g. normally living in Denmark, during a vacation in France he decides to call a friend in Denmark.

Public mobile network PMN1 covers the geographical area of France and public mobile network PMN2 covers the geographical area of Denmark. To the first subscriber, on vacation in France, public mobile network PMN1 is the visited public mobile network VPMN and PMN2 is the home public mobile network HPMN. To the friend living in Denmark using mobile device MD2 public mobile network PMN2 is the home public mobile network HPMN.

When the first subscriber uses mobile device MD1 in France to start a call from the visited public mobile network VPMN and the call terminates in Denmark at mobile device MD2, the France operator of the visited public mobile network VPMN and the first subscriber's operator in Denmark have to negotiate the tariff which the first subscriber is going to pay for "lending" the visited public mobile network VPMN to make the call.

This ability for wireless customers (subscribers) to automatically make and receive e.g. voice calls, send and receive data, or access other services when travelling outside the geographical coverage area of their own home public mobile network HPMN, by using a visited public mobile network VPMN is defined as "roaming". Roaming may both occur within the same country (e.g. large countries where the network of one network operator does not cover the whole country) and internationally as explained above when a subscriber travels to other geographical areas which are not covered by the subscriber's own home public mobile network HPMN.

When a roaming agreement is negotiated between network operators it enables the subscriber of one network operator to use the services provided by another network operated by another network operator.

There are various situations where roaming occurs e.g. if two subscribers both are on a visited public mobile network VPMN. This is the case for mobile device MD1 and MD3 on FIG. 2B which have the same mobile operator operating public mobile network PMN2. When the first subscriber with mobile device MD1 is calling the second subscriber with mobile device MD3, the call follows arrow A back to their home public mobile network HPMN then arrow B back to the visited public mobile network VPMN which then connects mobile device MD1 and MD3 (arrow C). The total cost is then split between the first and the second subscriber based on the two network operators' roaming agreement. Usually because the first subscriber has no idea of where the second subscriber is located the first subscriber only pays the part (arrow) A of the call from the visited public mobile network VPMN back to the home public mobile network HPMN. The second subscriber then pays the part (arrow) B of the call from the home public mobile network HPMN back to the visited public mobile network VPMN including the connection between mobile device MD1 and MD3 (arrow C).

The last scenario mentioned here of a plurality of scenarios where a roaming agreement may be necessary is when subscriber 1 with mobile device MD1 is located in a geographical area covered by a visited public mobile network VPMN and subscriber 2 with mobile device MD2 from the home public mobile network HPMN calls mobile device MD1 following arrow 1 and mobile device MD1 does not respond. Then the call is re-directed to the first subscriber's voice mail on the home public mobile network HPMN following arrow 2. To hear the voice mail, the first subscriber then has to call back to the home public mobile network HPMN to listen. In this situation the first subscriber pays for the call (arrow 1) to the visited public mobile network for the re-directed call (arrow 2) where the second subscriber has left a voice mail and for the caller (arrow 3) to listen to the voice mail.

As indicated roaming may occur both locally (e.g. with in the same country) and internationally between networks in different countries.

While in most cases roaming involves bi-lateral, two-way roaming, in some cases, unilateral or one way roaming takes place e.g. for technical or commercial reasons.

A plurality of different services may encounter in roaming, but especially GSM, International GPRS Roaming, CDMA and 3GSM Roaming (3GSM; Third Generation Global System for Mobile communication), are the most used services and therefore explained below. It should be noted that other not mentioned services also may encounter equivalents to the mentioned services as well as other services.

GSM is an abbreviation of Global System for Mobile Communications and future evolutions thereof (e.g. including but not limited to, GSM and UMTS (UMTS; Universal Mobile Telephone System) or its equivalent), as defined by the relevant technical specifications of the ETSI (ETSI; European Telecommunications Standards Institute), 3GPP (3GPP; Third Generation Partnership Project) and/or other standards development organizations together with other relevant documents and the Permanent Process Documents as recognized by the GSM Association.

International GPRS Roaming is an abbreviation of international General Packet Radio Service Roaming providing packet mode transmission between public mobile networks PMN and Interworking with external networks. International GPRS Roaming allows the service subscriber to send and receive data in an end-to-end packet transfer mode, without utilizing network resources in circuit switched mode, outside of their home public mobile network HPMN. For the avoidance of doubt, and in accordance with the relevant licensing requirements, International GPRS Roaming shall not prevent the user's operation of other GSM Services.

CDMA is an abbreviation of Code Division Multiple Access and is a mobile digital radio technology. CDMA permits many simultaneous transmitters on the same frequency channel. Since more phones can be served by fewer cell sites, CDMA-based standards have a significant economic advantage over TDMA (GSM)- or FDMA-based standards. CDMA2000 that is based on the CDMA technology is an incompatible competitor of the other major 3G standard UMTS. It is defined to operate at 450 MHz, 700 MHz, 800 MHz, 900 MHz, 1700 MHz, 1800 MHz, 1900 MHz and 2100 MHz.

3GSM Roaming means temporary granting of GSM services (see GSM above) by a public mobile network PMN other than the home public mobile network HPMN. International 3GSM roaming allows the serviced subscriber to send and receive data in an end-to-end packet transfer mode outside their home public mobile network HPMN and also make outgoing and incoming circuit switched connections such as voice calls.

FIG. 3 illustrates an overview of a public mobile network PMN with base stations BS1, BS2, BS3, BS4, . . . , BSn and a mobile device MD moving from one a first part 1PMN of the public mobile network PMN to a second part 2PMN of the public mobile network PMN.

Each individual call event traffic session in the public mobile network PMN is monitored and recorded in the two mobile switch centers MSC1 and MSC2. If a call event traffic session such as e.g. a call is made from the mobile device MD all the call-related data is obtained in a call detail record CDR, also sometimes referred to as event detail record.

In the example illustrated on FIG. 3, a public mobile network PMN is divided into a first and second public mobile network 1PMN and 2PMN which are operated by the same network operator. The first and second public mobile network 1PMN and 2PMN could also be operated by two different network operators if a roaming agreement is established between the two network operators.

The mobile device MD illustrated in FIG. 3 is wireless connected to base station BS2 of the first public mobile network 1PMN when the user of the mobile device MD is starting a call event traffic session e.g. starting a call or accesses the interne. During the call the user with the mobile device MD changes his geographical location to an area where the signal from base station BS3 is better than the signal from base station BS2. The call is then handed over from base station BS2 to base station BS3 without the user being aware of or noticing the handover. Another handover is made from base station BS3 to base station BS5 where the user terminates his call.

As long as base station BS2 and BS3 is handling the call mobile switch center MSC1 is recording call-related data related to the call event. When the call is handed over to base station BS5 the recording of call-related data is carried on by mobile switch center MSC2. Both of the two mobile switch centers MSC1 and MSC2 now comprise part of the call detail record CDR describing the call event. These call detail records CDR are provided to the network operator NO.

If the call was continued and the mobile device MD entered a third part (not shown) of the public mobile network PMN, a third mobile switch center MSC (not shown) was also recording part of the call-related data and sending this to the network operators NO.

When all individual parts of the call detail record CDR are sent from the individual mobile switch centers MSC to the network operators NO, the call detail record CDR is used in various ways e.g. for billing, statistics, etc.

A call detail record CDR may also sometimes be referred to as an event detail record. The call detail record CDR is a generic term for a data container that holds information of a call produced by the phone system containing e.g. the called number, calling number, location, and time of the day and call duration. The call detail record CDR may comprise more than 2000 different fields of information which together describe the call and handling of the call. Call-related data may e.g. be type of data traffic, duration of call event, calling party, called party, time and date of call event and technical details such as which base station in which public mobile network PMN is handling the call, etc. Of course the number of fields in a call detail record CDR depends on the type of data traffic to be described by the call detail record CDR and depending on the later use of the call detail record CDR not all fields are important.

To each individual call event traffic session a call detail record CDR is created, one call detail record CDR related to the calling party and another call detail record CDR related to the called party.

Now turning to FIG. 4 which illustrates a scenario where the public mobile network 1PMN is the home public mobile network HMPN to the mobile device MD and as described in relation to FIG. 3 the call event traffic sessions continues on public mobile network 3PMN which now is a visited public mobile network VPMN to the mobile device MD. The two different operators of the two public mobile networks 1PMN and 2PMN are roaming partners and therefore have agreements on the tariff of the call event traffic session, etc.

At present time the call may not automatically be handed over from the home public mobile network HPMN to the visited public mobile network VPMN. In the case illustrated in FIG. 4, the call may automatically be terminated when the signal from base station BS3 to the mobile device MD becomes less than a given threshold. To continue the call the subscriber may have to start a new call when the mobile device MD is connected to a base station comprised in the visited public mobile network. Alternatively, the call may be handed over automatically.

The part of the call-related data describing the call event traffic session made via the visited public mobile network VPMN are recorded by the roaming partners mobile switch center MSC3 and sent back to the roaming partner RP operating the visited public mobile network VPMN. Typically, the exchange of call-related data between roaming partners is performed via a data clearing house DCH but it is also common to transfer call-related data directly between mobile network operators.

Typically, network operators NO and RP collect call detail records CDR for a period of time e.g. for four hours and then flush or send only one transfer file TF comprising a filtered call detail record CDR for each individual call event traffic session made during these four hours. In one example, e.g. 500,000 individual call event traffic sessions are made to and from a visited public mobile network VPMN, from a number of subscribers, having subscription to different network operators, e.g. during four hours. These 500,000 individual call detail records CDR are then gathered in one transfer file TF which then is sent from the operator of the visited public mobile network VPMN to a data clearing house DCH. The data clearing house DCH then distributes the 500,000 individual call detail records CDR to the network operators to which the different subscribers have subscription. The 500,000 individual call detail records CDR may be filtered so that each call detail record CDR may not comprise more than e.g. 300 fields of call-related data.

The data clearing house DCH simply routes at least part of the recorded call-related data from an operator of a visited public mobile network VPMN to the operator of a subscriber's home public mobile network HPMN.

In relation to the present invention it may not be important that the network operators are using data clearing houses DCH for exchanging call-related data, other exchange methods may also be used such as direct operator to operator exchange.

Call-related data may be presented binary in a call detail record CDR. This binary representation may in an embodiment of the invention be converted to a text or table format. To ease the explanation throughout this document, the individual call-related data such as e.g. duration or starting time of a call event from the call detail record CDR is referred to as a field or entry.

The call-related data from the call event described in FIG. 4 is partly provided as call detail records CDR to the network operator NO from the network operator's own mobile switch center MSC1 and partly as a call detail record CDR from the roaming partners RP. The roaming partner sends a transfer file TF1 comprising call-related data related to all call events made in a period of time to a data clearing house DCH. The data clearing house DCH then divides and routes the content of the transfer file TF1 to the network operators NO, NOn, etc. which is the network operator of the subscribers which have used the roaming partner's RP public mobile network 3PMN. Hence, the network operator NO receives a transfer file TF2 comprising call-related data from call events made by network operator's NO own subscribers on the roaming partner's RP network. Network operator NOn receives in the same way transfer file TFn, etc.

It may not be necessary for the operator of the home public mobile network HPMN to receive all call-related data in a call detailed record CDR recorded from the operator of the visited public mobile network VPMN. Hence, the call-related data may be exchanged in different transfer file TF formats or standards depending on e.g. roaming agreement or type of public mobile network (e.g. GSM, CDMA). If the visited public mobile network VPMN is a GSM network, the standard for the exchanging of call-related data between network operators is preferably a transfer account procedure TAP file. If the visited public mobile network VPMN is a CDMA network, the standard for the exchanging of call-related data between network operators is preferably a CIBER file. Other formats than the two mentioned may also be used to exchange call-related data between roaming partners.

The transfer file TF may also be referred to as a call detail record CDR, but in the present application the transfer file TF refers to a representation of some of the call-related data represented in the call detail record CDR.

FIG. 5 illustrates the amount of call-related data occurring in relation to each individual call event. As described above all call-related data may be found in a call detail record CDR. The number of fields in a call detail record CDR may vary but can easily exceed 2000 fields of different information related to one call event. Not all of the data comprised in a call detail record CDR are interesting to the network operator whose subscribers are using the roaming partner's public mobile network PMN, only call-related data which can be used e.g. in billing or statistics may be interesting to the subscribers' network operator.

Hence, the most relevant information from the call detail record CDR are filtered and then a plurality of filtered call detail records FCDR are gathered to form a transfer file TF such as e.g. a transfer account procedure TAP file, cellular inter carrier billing exchange roamer CIBER file or its equivalents. This filtered call detail record FCDR may comprise more than 200 fields of call-related data and these fields are relevant for charging the subscriber for the call made on the roaming partner's public mobile network. FIG. 5 illustrates a transfer file TF with only one filtered call detail record FCDR, but a transfer file TF may comprise a plurality of filtered call detail record FCDR.

In an embodiment of the present invention, a further filtering of the filtered call detail record FCDR is performed so that only the most relevant call-related data is found on the record RE which is used for further processing in the present invention. Hence, a reduction is made of call-related data from the original call detail record CDR comprising more than 2000 fields to the record RE preferably comprising between 20 and 35 fields.

In an alternative embodiment of the invention, the further filtering is avoided by implementing the filtering of call-related data in the aggregation. This may not speed up the aggregation but it removes one procedure which may be advantageous in an embodiment of the invention.

If e.g. a mobile operator would care to know the revenue of voice calls made from a specific public mobile network PMN in Denmark to France at a given day, then a small mobile operator has to look through maybe 750,000 call detail records CDR of voice calls originating from the public mobile network PMN in Denmark to find the calls to France and filter these results by which day they were made and calculate the revenue. Performing these lookups and/or filtering may be very time and processor consuming and hence, one object of the present invention is optimizing the processing of call-related data.

In an embodiment of the invention, it may e.g. also be possible to find the exact number e.g. of calls from a specific public mobile network PMN in Denmark to a specific public mobile network PMN in France.

In an embodiment of the present invention, the first step is to convert all call-related data from the individual call events represented in the filtered call detail record FCDR comprised in the transfer file TF into a database representation and then store these call-related data in a database. In one embodiment of the invention, the database is a relational database but also databases which are not found in the category "relational database" may be used.

A database used in relation to an embodiment of the present invention is understood as a structured collection of records or data. A database relies upon software to organize the storage of data. The software may then model the database structure in a database model such as e.g. a relational model, hierarchical model or network model.

A database used in a preferred embodiment of the invention may e.g. be built as a XML (XML; Extensible Markup Language), TXT (TXT; extension for a text file), CSV (CSV; Comma-Separated Value) or SQL (SQL; Structured Query Language) database.

In an embodiment of the present invention, a further filtering of the call-related data now present in a database format is then performed. Hence, only the most relevant call-related data in relation to billing, pricing, simulating data traffic, etc. are extracted from the database.

Which of the fields of call-related data is relevant differs depending on whether the call event e.g. is a originating, terminating or maybe a GPRS call. Hence, some fields may be interesting if the fields relate to a voice call event but the same fields may not be interesting if the call event relates to GPRS. The same applies in relation to originating and terminating call events, not all fields may be of interest for both originating and terminating call events.

In a preferred embodiment of the invention, each call event is represented in a record RE with 26 fields of call-related data, extracted from the content of the database. Of course more or less than 26 fields of call-related data may be extracted, this would just influence the amount of data to be processed and thereby increase demands to the individual parts of the system processing the call-related data to obtain the same response time. If more than 26 fields of call-related data are extracted e.g. a more detailed simulation may be obtained or it would be possible to increase the number of possible simulations.

In the same way if less than 26 fields of call-related data is extracted, the response time of the processing of data may be faster but e.g. a simulation may be less accurate or the number of possible simulations may decrease.

Even with only 26 fields of call-related data the processing of call-related data may be extremely processor and time consuming partly because the high number of individual call event traffic session and partly because each of the 26 fields of call-related data potentially may comprise a plurality of different information. As an example can be mentioned that at present time more than 800 public mobile networks are present in around 250 countries around the world, hence, the field identifying which public mobile network is used to a specific call event traffic session could obtain more than 800 different values and the field identifying the country could obtain at least 250 different countries. Combining these two fields leaves 800×250=200,000 different combinations for each call event and together with the 25 other fields the number of possible combinations makes large demands e.g. to the processor, storage, etc. of the processing system.

The numbers 1, 2, 3, 4, 5 of the call detail record CDR, 1, 3, 35 or the filtered call detail record FCDR and 1, 35 of the Record RE are illustrating the filtering of the fields of the call detail record CDR.

Call-related data from a call event CE made within the public mobile network PMN in which the mobile operator to which the subscriber has a subscription are relatively easy to handle and store in e.g. a database. Call-related data from call events made between two public mobile networks (inbound or outbound) may be more difficult to handle, hence, data clearing houses are often used to ease handling of call-related data from such call events. Evidently such handling of data traffic between two networks will make the picture of the traffic far more blurred than if the traffic was just occurring within the providers' own network.

Below in table 1 is a non-exhaustive list of some of the above-mentioned most relevant fields of call-related data which is used in a preferred embodiment of the invention.

TABLE 1

| Field no. | Field name | Explanation |
|---|---|---|
| F1 | Record Type | Used to identify the record type. Can e.g. be Voice MOC (Mobile Originated Call), Voice MTC (Mobile Terminated Call), SMS MOC. |
| F2 | HPMN TAP code | Unique code to identify the Home Public Mobile Network. |
| F3 | VPMN TAP code | Unique code to identify the Visited Public Mobile Network. |
| F4 | Source TAP file sequence number | Sequence number of the TAP file. |
| F5 | IMSI | The identifier which uniquely identifies the subscriber who has used the network and is liable for any charges that may be incurred. |
| F6 | Call Event Start Timestamp | The timestamp gives the start of the call event. |
| F7 | Total Call Event Duration | The item contains the actual total duration of a call event as a number of seconds. |
| F8 | Charged units | The Charged Units item indicates the rounded number of units which are actually charged for. |
| F9 | Service Code | A code which uniquely defines a TeleService. (e.g. Voice, SMS or Data). |
| F10 | Called Number/ Dialed digits | The called number is the representation of the number dialed by the subscriber in establishing a call. |

TABLE 1-continued

| Field no. | Field name | Explanation |
|---|---|---|
| F11 | Call Type Level 1 | The highest category of call type in respect of the destination of the call. (e.g. National, International). |
| F12 | Call Type Level 2 | An item which identifies the sub category of Call Type Level 1. (e.g. Fixed or Mobile telephone). |
| F13 | Call Type Level 3 | An item which identifies the sub category of Call Type Level 2 as defined by the sending operator. |
| F14 | Destination type (internal) | Defines the destination of the call (e.g. Call Home, Local or International). |
| F15 | Country code | Defines the country from where the call took place. |
| F16 | Original charge value | The charge for the call (in SDR(SDR; Special Drawing Right)). |
| F17 | Original tax value | The tax value for the call (in SDR). |
| F18 | Re-priced charge value | If the charged value has been modified the new charge will be present here. |
| F19 | Re-priced tax value | If the tax value has been modified the new tax value (or VAT value) will be present here. |
| F20 | Recording Entity ID | Which network component registered the call. |
| F21 | Location Area Code | Identification of the Location Area Code of the mobile equipment handling the call. |
| F22 | Cell ID | The identity of the cell (e.g. group of antennas) from which the call originated or in which it terminated. |
| F23 | Video telephony Indicator | If the call was a Video call this field will be set. |
| F24 | CAMEL Indicator | If the call was made by a prepaid account this field will be set. |
| F25 | Dialed digits | The dialed digits item contains the actual digits as dialed by the subscriber, i.e. unmodified, in establishing a call. |
| F26 | Serving BID | The Serving BID (BID; Billing Identifier) is a code associated with a geographical area such as a cell site or group of cell sites. |

Turning to FIG. 6, if for example a network operator has 1,000,000 individual call events made on the 1 of January 2008 from different visited public mobile network VPMN (1,000,000 individual roamed call event traffic sessions), a plurality of transfer files TF, comprising call detail records CDR for each individual call event is received e.g. from a data clearing house or another network operator. Together the call detail records of these transfer files TF describes all the call events made on the 1 of January 2008 (only one transfer file TF is illustrated on FIG. 6). Each individual call event of the 1,000,000 is represented by more than 200 fields of call-related data leaving the total number of fields of call-related data which have to be stored in the data base DB>200*1,000,000=>200,000,000.

Because not all of the more than 200 fields of call-related data related to each individual call event is relevant a filter FI is provided. The filter FI is in a preferred embodiment of the invention filtering the fields so that a record RE of only 26 fields related to each individual call event is present after the filter FI.

The record RE comprising the 26 fields may still be regarded as a call detail record CDR, but to ease understanding "record RE" is used and refers to the 26 fields describing one individual call event.

If call-related data from more than one day was present the amount of call-related data would be very large and if a search or lookup in such large amount of data should be performed it would be very time and processor consuming.

All the call-related data present in the database DB defines a historical correct picture of the data traffic related to the network operators from which the call-related data is provided. Because of the precise picture of the data traffic the simulations, estimations or forecasts from an embodiment of the present invention may be very accurate. When using the terms correct and precise here it is understood that completely exact correct pictures of the data traffic may be difficult to achieve, but it may be done in an embodiment of the invention.

As illustrated in FIG. 6, an embodiment of the present invention performs an aggregation AG on the records RE. The result of the aggregation AG is that the call-related data from the plurality of call events now is represented in a call detail record representation CDRR. This call detail record representation CDRR comprises at least one pre-search result PSR which may be indexed and or stored e.g. in a database.

The pre-search results PSR may be understood as a summation of similar fields of call-related data in a call detail record CDR describing different individual call events, hence, the pre-search results PSR may overlap or comprise data from a plurality of call detail records CDR describing different individual call events. This could be illustrated by 100 call events made from Italy to Denmark from 4 different Italian public mobile networks PMN with 25 call events from each public mobile network PMN. These calls may be represented in different pre-search results PSR depending on their duration, destination, time of day of the call, public mobile network PMN, etc.

Call-related data e.g. from a transfer file describing all the individual call events may be stored in the database DB.

It should be noted that one pre-search result PRS may comprise a plurality of sub results.

Depending on requirements to e.g. the response time of the system, the number of possible queries the user may be presented to, detail level of simulations, etc. the filter FI is filtering the content of the database DB. The result of this filtering leaves in an embodiment of the invention a record RE comprising between 20 and 30 different fields describing each individual call and in a preferred embodiment of the invention the record RE comprises 26 fields. The number of fields in the record RE after the filter FI is depending on the specific use of the embodiment of the invention, hence, even down to 5-10 fields and up to more than 100 fields may in some embodiments be preferred.

Another reason that it is not necessary to aggregate all of the call-related data in the database DB is that the designer of the system in a preferred embodiment of the present invention knows what a user would require from the system or determines in advance which queries a user is allowed to perform. Hence, only the call-related data necessary to answer these queries, from the huge amount of call-related data in the database DB, are filtered by means of the filter FI and then aggregated indexed or pre-searched.

The content of the fields in the records RE is then aggregated AG, resulting in a call detail record representation CDRR comprising at least one pre-search result PSR. These pre-search results PSR may then in a preferred embodiment of the invention be stored e.g. in a database or alternatives hereto, so that the result of the aggregation AG is structured or indexed and easily accessible. This database may not be the same as the database DB illustrated on FIGS. 7 and 8.

An additional layer of aggregation AAG may then be added to the call detail record representation CDRR to process an output from the results of the first aggregation AG (also referred to as initial aggregation), which in an embodiment of the invention could describe the total amount of data traffic to the Scandinavian countries. The result RES of the additional aggregation AAG may then e.g. on request from a user output any combination of the call detail record representation CDRR, the result of the first aggregation AG. Further more an economical aspect may be added to the result RES from which the user may be able to predict revenue related to e.g. one or all the Scandinavian countries. A further description of the interaction between the additional layer of aggregation AAG, user input and result of the first aggregation is found in relation to FIGS. 8 and 9.

In an embodiment of the invention, the additional aggregation AAG, which may be regarded rather primitive compared to the first aggregation AG, increases the speed of processing the call-related data because the additional aggregation AAG is based on already aggregated call-related data. In this way the user gets an opportunity to determine user-defined aggregations on top of the result of the first aggregation AG.

The term aggregation AG used throughout the present document may be interpreted as a combination of correlating, indexing and pre-searching or preferably just as indexing.

When using the term indexing of call-related data to define the term aggregation it should not be understood as the common general definition. The indexing of call-related data in an embodiment of the present invention is "unidirectional". This means that in an embodiment of the invention when the present invention is indexing (aggregating) records RE of call-related data, the system may in one example find 17,000 records RE describing calls originating or terminating in Italy. This information is then stored as or as part of a pre-search result PSR. From this pre-search result PSR it is not possible to go back to the original 17,000 records RE to obtain further information related to these 17,000 calls to Italy. Further information such as which mobile operator in Italy was used in connection with the 17,000 calls, can be found in another pre-search result PSR or as a sub-result of the same pre-search result PSR. Hence, in this embodiment of the present invention to find out how many of the 17,000 calls were made to or from the two main network operators in Italy the present invention simply performs two lookups in two pre-search results PSR or two sub results or the same pre-search result PSR to answer.

The query of how many calls were made to and from the two largest network operators in Italy is in an embodiment of the present invention made very fast because it is only necessary to perform a lookup in two pre-search results PSR in contrary to lookup in all 17,000 records RE comprising calls terminating or originating in Italy.

In an embodiment of the invention, the more specific the queries, the faster the present invention becomes compared to other conventional systems which have to look up in each individual record comprising call-related data. Hence, if the user would like to get the number of calls from Germany, France, Spain and Portugal and which network operators were used in these 4 countries the present invention would only have to perform a lookup in the pre-search result PSR comprising countries (1 lookup) and operators in these countries (4 lookups). This may be done real time in contrary to conventional systems which have to go through all the call-related data comprised in the transfer files TF to answer these simple questions.

In other words the aggregation AG of the records RE may be compared to a pre-search of the records RE, so when the user of an embodiment of the present invention performs a query, the system only has to perform a lookup in one or more pre-search results PSR instead of performing a lookup in the huge amount of call-related data in the database DB.

A user, according to an embodiment of the present invention, may e.g. be an operator of a mobile network also referred to as mobile operator or network operator, adviser, etc.

Until the aggregation AG no loss of call-related data has occurred, hence, until this stage it is possible to trace call-related data back to e.g. the mobile device which started the call event traffic session. After the aggregation AG this is no longer possible as explained below but the call-related data may still be found in the database DB.

The above example is a simplified explanation of the principle of different embodiments of the present invention and should only be read as so to ease understanding of the invention.

The present invention may include a plurality of different features or subset of data processings to optimize the processing of call-related data.

One feature which in an embodiment of the invention is an essential feature is B-number normalization. The B-number is the number, e.g. telephone number of the called party, and it is obvious that it is important that the B-number is represented correct e.g. in the data base and in the record RE. Hence, in relation to storing the call detail record CDR in the database DB at least some of the B-numbers have to be normalized or expressed unequivocally. One example could be a voice call to Denmark where the calling party is outside Denmark and he may use the country code 0045 or +45, these two ways of typing the country code have to be expressed the same way in e.g. the database DB.

Of course the B-number normalization may be done at different stages in the processing of data in the present invention such as in relation to the aggregation.

A further feature related to an embodiment of the present invention is creating suitable interfaces to ease integration of the present invention into existing systems or to ease transfer of data within the present invention. A simple way of creating an interface is simply represent the call-related data in a text file. Of course this is just one way of creating an interface between two blocks of the present invention such as e.g. the database DB and the aggregations AG.

Since the aggregation of call-related data is a key feature of the present invention, a more detailed description of some of the requirements to which information the aggregation must retain is provided below. As mentioned after the aggregation information is lost, hence, the call-related data from the individual call event traffic sessions is no longer available. Therefore, a good aggregation is keeping the right balance between the flexibility (detail level) of the aggregated data and the size (information lost) of aggregated data. It should be mentioned that it is possible e.g. to keep a copy of the original call-related data, to be able to redo the aggregation or perform additional aggregations.

The most important contribution of the aggregation of the present invention is minimizing application memory footprint, in other words unless an extreme powerful data processor and memory (relative to presently known data processors and memory) is provided it is not possible to store call-related data from individual call event traffic sessions in a memory (partly including permanent storage such as e.g. a hard disk) and from the memory/storage perform analyses, simulations, calculations, etc. in real time.

Real time analyses, simulations, etc. are in an embodiment of the present invention provided because of the aggregation of call-related data. In this context real time is defined as the actual time during which something takes place e.g. a computer may partly analyze the data in real time (as it comes in) or may be compared to a search on Google where the search results is presented to the user immediately or real time.

In an embodiment of the present invention, it is important that the aggregation does not impact the accountability, accuracy and precision of the analysis, simulations, forecasts, calculated revenue and cost, etc.

The accuracy and precision are very important factors in predictive pricing analysis tools, as the tariff simulations and predictions of profit impact on a Mobile Network Operator's roaming business needs to be trustworthy and reliable.

In the fields of science, and statistics, accuracy is the degree of conformity of a measured or calculated quantity to its actual (true) value. Accuracy is closely related to precision, also called reproducibility or repeatability, the degree to which further measurements or calculations show the same or similar results. The results of calculations or measurements can be accurate but not precise; precise but not accurate; neither; or both. A result is considered valid if it is both accurate and precise.

It is an object of one embodiment of the invention to provide the highest quality of analysis algorithms as well as valid result of calculations or measuring of revenues, costs, profits, usage behavior, amount of data traffic and other key figures.

To be able to perform a useful aggregation, some fields from the transfer file TF are more important than others; hence, care should be taken when filtering and thereby excluding fields from the aggregation and at the same time keeping the aggregation flexible enough to support all of the requirements a user may require from the present invention.

In a preferred embodiment of the invention, at least one pre-search result PSR in one or more of the following aggregations is provided:
  A base aggregation.
  A tariff aggregation.
  A key figure aggregation.
  A call destination aggregation and
  an analysis aggregation.

The above listed aggregation results will be discussed below and in relation to FIG. 8.

As mentioned these pre-search results PSR represent the preferred pre-search results PSR but the list is not exhaustive, of course further aggregations may be included or excluded leading to other pre-search results PSR or excluding some of the mentioned pre-search results PSR to optimize or solve different requests from the user.

One of a plurality of examples of use of the system could be the case where the user e.g. is a network operator. In this case one requirement to the present invention could e.g. be calculating or simulating different pricing models leading to tariff plans.

A pricing model defines the framework or sets up the conditions based on which a tariff plan can be made. Typically, a pricing model comprises origination and destination zones comprising different countries, e.g. often the Scandinavian countries represent one zone, and then it is possible for the user to easily charge the subscribers the same tariff no matter in which country within the Scandinavian zone the subscriber is present when performing a call event. Another content of a pricing model may be the way of charging subscribers e.g. if a call event is charged per second or per minute. The network operator has to decide on such framework before it is possible to make the most optimal tariff plan. A tariff plan may be compared and referred to as a price list, often the network operators have a tariff plan directed to the roaming partners and another directed towards subscribers. In this way the subscribers can in advance see what the network operator charges for call events on different roaming partner's public mobile network and the roaming partners have a basis for making a roaming agreement.

One embodiment of the present invention allows the user e.g. a network operator to estimate changes in revenue by simulating e.g. change in the countries in the country zones or the way of charging the subscribers (per minute or per second) or by adding assumptions to the historically correct call-related data present in the records RE.

This is done based on at least one of the aggregations or based on a combination of the aggregations described below.

Requirements to the Aggregation

As described above the aggregation looses data and since e.g. the origination country and destination country zones are important to the network operator when calculating or simulating roaming tariff plans, the aggregation must in a preferred embodiment of the invention retain information of each combination of call origination and call destination zone including:

Total roaming partner costs, including cost information from all roaming partners since calls may originate or terminate in any zone in the world. The roaming partner cost may be compared to a fee which roaming partner 1 has to pay roaming partner 2 to be allowed to let the subscribers of roaming partner 1 use roaming partner 2's public mobile network.
  The number of call events per duration when the data traffic is a voice or video calls, e.g. the number of call events with a duration on exactly 29 seconds, exactly 30 seconds, etc.
  The number of sessions when the data traffic is a GPRS a session.
  The number of call events when the data traffic is SMS.
  A call event is simply the data traffic related to the individual event such as e.g. a voice call, one SMS, a video call, etc.
  A GPRS session starts when the subscriber activates the GPRS function on the mobile device and terminates when the subscriber either turn off his mobile device or turn off the GPRS function. The fact that the GPRS session is open does not imply that data is transferred between e.g. the internet and the mobile device.

In a preferred embodiment of the invention, the user can add certain assumptions to the system that allows the user to predict changes in the subscribers' behavior or traffic patterns for the future. Since it is possible for the user to add assumptions to the call-related data present in the record RE e.g. a decrease in calls from Denmark to Germany by 5% and since these assumptions typically are related in time to call origination and call destination zones, the aggregation must retain information of time at the day (time band), day, month and year of each individual call event.

It is also possible for the user to choose different countries and based on these countries establish user-defined call event originating zones including different public mobile networks PMN, hence, the aggregation must retain call event originating zone for each individual call event.

The tariff differs when using different services e.g. a GPRS call event may not be charged the same as a voice call event and furthermore the charge may not be the same for these services in every origination/destination zones. Because the user has to be able to distinguish between e.g. GPRS and voice call events, the aggregation must retain information of the access point name APN of the event destination zone for GPRS calls. For voice, video and SMS services call events destination country must be retained. The access point name APN is the name of the specific access point the mobile device MD is connected to when using a GPRS service.

One more feature which often is important to the user, especially if the user is a network operator, is the ability to define special destination zones, e.g. to be able to locate calls to discount or free zones such as local call, calls home or calls to premium numbers. This requires from the aggregation that the destination type, information of the called party, must be retained.

Maybe the most important field to retain is the duration of a call event traffic session, since many tariff plans and assumption based calculations are related to the time of the day the event took place, the aggregation must also be done at a time band level, and i.e. an aggregation table may be created for each time band. The individual time band aggregations will only hold information about call events that belong in the specific time band, service type and segment. A segment is a division of subscribers into different sub-groups such as e.g. business subscribers segment or private subscribers segment. This avails the user to charge subscribers different for the same service depending on in which segment the subscriber belongs.

The above underlines the fact that there is no fixed number of fields to retain and the earlier mentioned 26 fields in a preferred embodiment of the invention may be changed according to the requirements to the present invention.

Below is a sum up of the above-described call-related data which is essential to retain from the aggregation in a preferred embodiment of the invention:

Total roaming partner costs, this includes cost information from all roaming partners since calls may originate or terminate in any zone in the world.
The number of call events per duration when the data traffic is a voice or video calls.
The number of sessions per volume when the data traffic is a GPRS session.
The number of call events when the data traffic is SMS.
Event week, month and year.
The event origination public mobile network PMN.
For GPRS call events, destination access point.
For voice and video call events, destination country.
For voice and video call events, destination type.
Duration time of each call event.
IMSI number for the subscriber's mobile device.

The IMSI number is important to retain because it identifies the subscriber and in this way the network operator is e.g. able to give a discount to employees from large companies.

Of course the above description of which fields of call-related data the aggregation must retain is just a description of one embodiment of the aggregation of the present invention. The description may be modulated e.g. to allow other queries from the user or less accurate calculations and hence, the aggregation should retain more or less call-related data from a call event than mentioned above.

Time Band Aggregation

One of a plurality of pre-search results PSR illustrated on FIG. 6 is a Time Band aggregation table. The time band defines different periods of time during a day. An example could be that a first time band is from 7 am to 3 pm, a second time band from 3 pm to 23 pm and a third time band from 23 pm to 7 am.

Hence, the object of the time band aggregation is to summarize the number of call event which have occurred in a given time band.

Then the network operator gets further possibilities of making discounts to the subscribers if they e.g. are calling in the third time band instead of in the first time band.

When the time band aggregation has been made it is still possible for the network operator to add a further time band, but then a new time band aggregation has to be made.

Base Aggregation

A further pre-search result PSR illustrated on FIG. 6 is a base aggregation table. In a preferred embodiment of the invention, a base aggregation table is made based on at least some of the above listed retained call-related data. In a preferred embodiment of the invention, the base aggregation includes at least one of the following entities or fields (fields of call detail record CDR):

Event origination (from which public mobile network PMN the event stated).
Event destination.
  For voice and video events, destination country.
  For SMS e.g. message central.
  For GPRS the access point name.
For video and voice call, call destination type.
Month and year.

Network operators may have their own message central used to distribute text messages (SMS). When a subscriber is sending an SMS it is sent to the message central and from there routed to the telephone number of the subscriber attached to the SMS.

In relation to the above-mentioned entities, a value (or charge) is added to each of the entities:

Total roaming partner charge.
For voice and video, number of call events by duration.
For SMS, number of call events.
For GPRS, number of sessions by volume (e.g. same data traffic volume).

In a preferred embodiment of the present invention the base aggregation table is implemented in an intelligent way which ensures that only entries that actually contain data are added to the table. For example if the transfer file TF comprising call-related data from all call events made in the past 4 hours does not contain any events originating in a specific public mobile network PMN, e.g. TDC Denmark's network, there will be no entries in the base aggregation table for TDC Denmark's network.

Despite of the intelligent implementation of the base aggregation table, the size of the base aggregation table is potentially an issue. A preferred embodiment of the present invention includes reference tables of around 800 public mobile networks PMN located in around 250 countries around the world. So for the user to include all of the public mobile networks PMN and countries from the reference tables in one simulation e.g. for a voice call events, a data set including all transfer files TF comprising call-related data from the last 12 months would lead to 800*250*12=2,400,000 entities.

In a preferred embodiment of the invention, reference tables are provided. These reference tables may e.g. include the majority of all public mobile networks PMN in the world, the majority of countries in the world, economical or geographical regions, currency codes, exchange rates, etc.

These reference tables may be stored in a database or in any other suitable way related to the specific embodiment of the invention, this database may not be the same as the database DB illustrated on FIGS. 7 and 8. Furthermore, these reference tables may be accessible e.g. for updating.

A simulation example of the tariff planning would contain events from 400 different public mobile networks to 100 different countries, the base aggregation table would then contain some (400*100*12=) 480,000 entries One of several problems of an embodiment of the invention is to access extreme amounts of data as fast and efficient as possible and at the same time gain valuable information.

Key Figure Aggregations

A further pre-search result PSR illustrated in FIG. 6 is a key figure aggregation. A key figure may in an embodiment of the invention e.g. be the result of a simulation or analysis performed by the present invention on demand from the user such as a network operator. Such simulation or analysis may both comprise historical data from the call detail record and input from the user and the result may e.g. be the user's revenue.

To be able to present key figures such as the revenue of a simulation or analysis in real time, the previously mentioned aggregations have to be combined with the result of the key figure aggregations.

The key aggregation may in a preferred embodiment of the invention result in a table comprising at least the Call Destination, GPRS Destination and Event Origination but of course it could be relevant to get quick access to several other key aggregation results.

The key figure aggregations may be implemented to work at different levels in the present invention such as e.g. the time band level or preferably at a segment level. In a preferred embodiment of the invention, the following is the results of the key figure aggregation:

- Number of unique subscribers per destination country.
- Number of unique subscribers per group of destination countries.
- Number of unique subscribers per call destination type.
- Total number of voice minutes that originated within a given public mobile network.

The key figure aggregation is implemented to give quick access to vital information and to minimize the need of memory and CPU footprint.

It is always worth considering the degree of aggregation. To put it bluntly, the harder call-related data is aggregated the faster the system becomes and the less memory is required, but the less detailed result is obtained.

Without the key figure aggregation it is for example possible either to take call-related data from the past year or to take the result of the base aggregation and aggregate it so that the user may see the revenue from the past year, this may be done fast and without special requirements to the memory. But then it is not possible for the user to see the revenue for each month. In an embodiment of the present invention, with the key figure aggregation it becomes possible to get revenue results from each month or in an embodiment of the invention even at a weekly or daily basis. This may be done by combining the results of the key feature aggregation with the results of e.g. the tariff plan aggregation.

Key Figure Aggregation for Call Destination

In a preferred embodiment of the invention, a key feature aggregation for call destinations is performed resulting in a pre-search result PSR comprising the following entities:

- Number of unique subscribers.
- Number of voice call events.
- Number of voice minutes.
- Number of video call events.
- Number of video minutes.
- Cost of mobile originated call events (both voice and video).

The aggregation of key entities related to call destination is simpler and less memory consuming than the above-mentioned base aggregation, hence, the key entities related to call destination aggregation requires:

- No storing of information about the call origination.
- No storing of information about the duration of individual calls, hence, only information of the total number of call units (e.g. seconds) and total number of calls are stored.
- No storing of information about call time (year, month), and
- the cost of a call event may only be stored in SDR, hence, no split of costs between roaming partner charge and tax is needed.

Further requirements to the key entities related to call destination aggregations includes

- storing of a set of unique subscribers (IMSIs) for each table entry and
- storing both the destination country and the call destination type (call local, call home, call international, call incoming, etc.).

Key Figure Aggregation for GPRS Destination

The aggregation of GPRS destinations are much similar, hence, the main difference is that the destination of a GPRS call event is an APN instead of a country.

In a preferred embodiment of the invention, the key figure aggregation for GPRS destinations is performed resulting in a pre-search result PSR comprising the following entities:

- Number of unique subscribers per APN or GPRS zone.
- Number of sessions per APN or GPRS zone.
- Total volume (incoming and outgoing) per APN or GPRS zone.
- Total cost in SDR per APN or GPRS zone.

A subscriber may use the GPRS service for different purposes such as sending MMS, browsing the internet e.g. using WAP, the email related blackberry application, etc. Each of these different services is defined as individual GPRS zones. In this way the mobile operator may charge the different uses/different zones of the GPRS service differently.

GPRS zones are basically a list of access point names, consequently it is sufficient to store the following information per unique access point name:

- The number of sessions.
- The number of bytes (incoming and outgoing).

The total cost in SDR.
A set of unique IMSIs.

Key Figure Aggregation for Event Origination

In a preferred embodiment of the presenting invention, at least two different types of event origination zones must be supported:
  one containing a list of public mobile networks and
  one containing all un-zoned public mobile networks.

Both types are basically a list of public mobile networks, thus it is sufficient to store the following information per public mobile network:
  Number of unique subscribers.
  Number of voice calls.
  Number of video calls.
  Number of SMS messages.
  Number of GPRS sessions.
  Total voice duration in minutes.
  Total video duration in minutes.
  Total GPRS volume (incoming and outgoing) in Mb.
  Total cost of voice and video traffic in SDR.

Analysis Aggregation

A further pre-search result PSR illustrated in FIG. 6 is an analysis aggregation. The Analysis Aggregation allows the user to view the key figures in different ways such as e.g. in form of charts, graphs, numbers, tables, etc. The analysis aggregation is trigged by the user and depending on the requirements from the user not all of the below-listed results may be available.

For voice and video the following may be available e.g. presented in form of charts:
  Call duration distribution (percentage of calls by call duration).
  Price per minute (percentage of calls by roaming partner charge per minute).
  Destination market size cost (roaming partner cost by destination) per destination country, geographical region, or call zone.
  Destination market size duration (hours by destination) per destination country, geographical region, or call zone.
  Origination market size cost (roaming partner charge by origination) per public mobile network, country, geographical region, or origination zone.
  Origination market size duration (hours by origination) per public mobile network, country, geographical region, or origination zone.
  Usage distribution duration (hours by date).
  Usage distribution cost (roaming partner charge by date).

For GPRS the following may be available e.g. presented in form of charts:
  Session volume distribution (percentage of sessions by volume).
  Price per Mb (percentage of sessions by roaming partner charge per Mb).
  Destination market size cost (roaming partner cost by APN) per destination APN or GPRS zone.
  Origination market size cost (roaming partner cost by origination) per origination public mobile network, country, geographical region, or origination zone.
  Destination market size volume (volume by APN) per destination APN or GPRS zone.
  Origination market size volume (volume by origination) per origination public mobile network, country, geographical region, or origination zone.
  Usage distribution volume (volume by date).
  Usage distribution cost (roaming partner charge by date).

For SMS the following may be available e.g. presented in form of charts:
  Price per message (percentage of messages by roaming partner charge per message).
  Origination market size cost (roaming partner cost by origination) per origination public mobile network, country, geographical region, or origination zone.
  Origination market size volume (number of messages by origination) per origination public mobile network, country, geographical region, or origination zone.
  Usage distribution volume (number of messages by date).
  Usage distribution cost (roaming partner cost by date).

The charts may be available on time band level and the user can restrict the charts to cover only events from a specific period of time (e.g. week level).

Apart from the information being stored on weekly level rather than monthly level, most of the information is available in the basic aggregation. Again a specialized aggregation is introduced.

The key in the chart aggregation table consists of
  Event origination public mobile network.
  Event destination country (only voice, video).
  Event destination type (only voice, video).
  Event destination APN (only GPRS).
  Event week and year.

For each key the following information is recorded:
  Distribution of calls by duration in seconds (voice, video).
  Distribution of session volume in bytes (GPRS).
  Total roaming partner cost in SDR.
  Total duration in seconds (voice, video).
  Total number of call events (all service types).
  Total volume in bytes (GPRS).
  Average price per minute (voice, video).
  Average price per message (SMS).
  Average price per Mb (GPRS).

The very specialized information allows for very fast generation of the charts regardless of the origination/destination grouping selected.

The additional aggregations AAG illustrated on FIG. 6 could e.g. be understood as a further aggregation of the aggregation results in the pre-search results PSR comprised in the call detail record representation CDRR.

Tariff Plan Aggregation

An additional aggregation(s) AAG is illustrated on FIG. 6 and could e.g. be a tariff plan aggregation. The tariff plan aggregation calculates the revenue and cost for a given segment, service type and time band based on the base aggregation described above.

The tariff plan aggregation potentially involves a large number of table lookups followed by a large number of additions and multiplications. As indicated above in a worst case scenario calculation of the revenue would involve some 12 million lookups followed by the calculation of the revenue for each of the call durations using the specified pricing model. It is fairly obvious that the base aggregation is a poor starting point in terms of CPU consumption and time. In order to overcome this issue an additional layer of aggregation is introduced, such as the tariff plan aggregation.

The tariff plan aggregation is based on the origination and destination zones defined by the user. The aggregation is a further aggregation of the data available in the base aggregation and it is at this aggregation input from the user is included. Input from the user may e.g. be moving all data traffic from one network operator to another network operator in one specific country or add an estimated increase in the data traffic to a given country e.g. by 15%. A further description of these inputs may be found in relation to FIG. 8.

This further aggregation will e.g. be used to combine user inputs with the result of e.g. the base aggregation e.g. to calculate the revenue and cost for the individual combinations of origination and destination zones or predict the effect of user defined supplements to the historical data found in the call detail records.

The tariff plan aggregation may be generated the first time it is needed and then in a preferred embodiment of the invention stored in memory. During simulations performed in an embodiment of the invention any changes to e.g. the origination or destination zoning of one or more segments may automatically be tracked. In an embodiment of the present invention, when a change is observed, a new tariff plan aggregation will be generated.

In order to support the tariff plan as well as inputs from the user, the result of this further aggregation may in a preferred embodiment of the invention contain the following:

- For the voice and video service types: For each combination of origination zone, destination zone, and month/year, the number of call events by duration (in seconds) as well as the total roaming partner charge and tax. In an embodiment of the invention, this charge is presented in SDR or alternative currencies. The SDR is a standard currency used in relation to roaming and controlled by the IMF (IMF; International Monetary Fund).
- For the SMS service type: For each origination zone and each month/year the number of events and the roaming partner charge and tax (in SDR or alternative currencies) is stored.
- For the GPRS (including MMS) service type: For each combination of origination zone destination zone, and month/year, the number of sessions by volume (in bytes) as well as the total roaming partner charge and tax (in SDR or alternative currencies) is stored.

In the worst case scenario this further aggregation would have roughly the same size as the base aggregation (in this case the user chooses one PMN per origination zone, one country per destination zone, etc.).

It should be noted that the above mentioned aggregations and additional aggregation may be supported by not mentioned aggregations. Furthermore, the grouping of aggregations and additional aggregations may differ form the description above. The group in which an aggregation is placed may differ depending on e.g. requirements from the user.

The result of these aggregations may be referred to as aggregations tables.

Query Application

In an embodiment of the invention, a query application QP is adapted for using the pre-search results PSR to form an output and in a further embodiment of the invention to combine input from the user with the pre-search results PSR to form an output via an output module OM.

The output may be the result of a simulation, analysis, forecast or prediction of future data traffic, etc. The result may be specifically directed to the individual user of the system but in a preferred embodiment of the invention, the result is the revenue or cost e.g. a network operator has gained in relation to roaming.

Such revenue may be the total revenue of e.g. the last 12 months related to one or a group of countries, one or a group of roaming partners, etc. The list is not exhaustive and the present invention may include revenue from all the roaming partners or network operators from which call-related data is provided to the present invention.

A further possible output from the present invention is based on input from the user and predicts or forecast the revenue or cost, if the future amount of data traffic decreases or increases. The number or percentage by which the data traffic decreases or increases may in an embodiment of the invention be decided and provided to the present invention by the user. This may e.g. include predicting the revenue or cost in general or to or between different countries or network operators. This is possible because the query application QP allows the user to adjust the future amount of data traffic, to simulate an increased or decreased amount of data traffic. Because in one embodiment the present invention is built upon real historical data, it is possible for the user, when he/she receives the result of a query, to apply e.g. estimated increased data traffic of 10%. This may e.g. be done by multiplying relevant aggregation sub results in the base aggregation table BA by 10% and then perform a new tariff aggregation which may be done real time.

In this way the user is able to see how the changes made to one or more type of subscription would affect the revenue or cost if e.g. the data traffic increases by 10%. Of course the 10% is just an example and it is completely up to the user to define the percentage of increase or decrease in the data traffic or which parameter to adjust. Hence, in an embodiment of the invention, the output may be partly user defined Of course when simulating events in the future a risk occurs that the simulation is wrong and therefore the result of the analysis performed by the present invention may not be as high as when analyzing other scenarios which are based completely on historical data.

A further possible output from the present invention is also based on input from the user e.g. a network operator. It is possible for the network operator e.g. to simulate the revenue or cost if he is steering all data traffic for his own subscribers from one roaming partner to another roaming partner in a given country or group of countries. Again a plurality of different combinations is possible to simulate, the only requirement is that call-related data from the involved countries and roaming partners are provided to the present invention.

Again after the user has provided the present invention with assumptions or requirements related to the data traffic, a new tariff aggregation may be performed real time and the output is provided to the user.

A further possible output from the present invention is monitoring of data traffic. The present invention may in an embodiment be adapted to monitor the data traffic in one or more public mobile networks PMN. In an embodiment of the invention, this output may be used to steer the data traffic between different roaming partners. If a roaming agreement between roaming partner 1 and 2 implies that the subscribers of roaming partner 1 have to use roaming partner 2's public mobile network 10,000 hours to get a discount. Then the present invention could be used in a monitoring application so when the 10,000 hours are used the subscribers are sent to another roaming partner to obtain similar discounts.

Like the examples described above there are various other possibilities for the user to adjust or add parameters to the call-related data in the form of pre-search results PST and then e.g. simulate the revenue or perform an analysis of the data traffic situation based on this user input.

Like the examples described above where a user is providing information to the present invention, there is also a plurality of possible simulations or predictions which may be made without input form the user, e.g. the effect of steering data traffic between roaming partners, rearranging countries in the different zones, etc.

The output module OM of the present invention may present the output to the user in various ways such as e.g.

graphs, geometrical figures, maps, numbers, tables, charts or any other sensible presentation forms.

In addition, the present invention may also provide output which is not visual to the user but may be used as input to other internal or external systems. Of course this could be in a combination with displaying the output to the user.

The query application enables the user to input data which then in real time is reflected in the simulation of the call-related data.

FIG. 7 illustrates an overview of the exchange of call-related data between two roaming partners RP1 and RP2. Roaming partner RP1 operates the public mobile network PMN4 where the two subscribers with mobile device MD1 and MD2 are performing call events CE1 and CE2. These call events produce call detail records CDR1 and CDR2 which are stored by the roaming partner RP1. Likewise subscriber 3 and subscriber n with mobile devices MD3 and MDn perform calls which also produce call detail records CDR3 and CDRn. After four hours 4 H the roaming partner RP1 filters or truncates call detail records CDR1-CDRn so that they are converted into truncated call detail records CDR1*-CDRn*. These truncated call detail records are then gathered in one transfer file TF and sent e.g. to a data clearing house DCH or directly to roaming partners. From here the truncated call detail records are routed to the roaming partners where subscriber 1-$n$ has a subscription, so that the call-related data from subscriber 1 and 2 are sent to roaming partner RP2, from subscriber 3 is sent to roaming partner RP3 and from subscriber n is sent to roaming partner RPn.

Roaming partner RP2 is using the present invention and, hence, the call-related data from the truncated call detail records CDR1* and CDR2* are stored in the database DB. Then the truncated call detail records CDR1* and CDR2* are filtered once again resulting in record RE1 and RE2, so now the most relevant call-related data, in relation to billing, from call event CE1 and CE2 are found in record RE1 and RE2. The call-related data from record RE1 and RE2 is then aggregated AG at least once resulting in a call detail record representation CDRR comprising at least one pre-search result PSR.

The user may then access the pre-search results via the query application QP and in a further embodiment of the invention also access the content of the database DB.

In relation to FIG. 7 it has to be mentioned that the flow of data and roamed public mobile networks may go both ways (inbound and outbound) and that a plurality of truncated call detail records are often received from the data clearing house.

The part XX of FIG. 7 is illustrated in further details on FIG. 8.

FIG. 8 illustrates the part XX of FIG. 7 where the call detail record representation CDRR including the pre-search results PSR and the query application QP interacts to produce an output.

FIG. 8 illustrates the pre-search results PSR from the aggregation of call-related data as described above.

The result tables of the base aggregation BA, time band aggregation TB, key figure aggregation KE and analysis aggregation AN represents a group of initial aggregation results, and the tariff aggregation is aggregating the initial aggregation results to provide an output to the user.

In figurative terms the base aggregation table BA e.g. "counts" the total number of call events divided into the different service types, from which public mobile network these call events originate, month and year of the call event, etc.

In figurative terms the time band aggregation table TB e.g. "counts" the total number of call events made within the different time bands.

In figurative terms the key figure aggregation table KE e.g. "counts" the total number of unique subscribers per destination country, total duration (in seconds) of voice call events within a given public mobile network.

In figurative terms the analysis aggregation AN e.g. gathers different key figures or analyzing results describing e.g. the destination market, the origination market and other service type specific analyzing results.

The block PSRn indicates that further initial aggregations may be performed.

Depending on available hardware and amount of call-related data in the database DB, it is time consuming to perform these initial aggregations. These aggregations may in an embodiment of the invention be performed at any time of the day when the hardware does not have any other jobs to process e.g. at night. When the initial aggregations are performed they serve as the foundation on which the real time simulations may be performed.

The last of the illustrated aggregation tables on FIG. 8 is the tariff aggregation table TA, which together with the input module IM is the user's access to the historical call-related data.

In figurative terms the tariff aggregation TA may be seen as an additional aggregation e.g. based on origination and destination zones which together with the above-mentioned aggregations may calculate revenue or costs e.g. for the individual combinations of origination and destination zones.

In an embodiment of the invention, the call-related data aggregated in the initial aggregations may be considered as pre-search results (e.g. the number of call events to each country in Europe) so when the user sets op the framework for the simulation e.g. origination zone (some of Europe countries) and destination zones, the present invention (in form of an additional aggregation) he only has to look up in the pre-search results instead of time consuming look-ups in e.g. the database DB. In this way the simulation can provide simulation results real time.

In an embodiment of the invention, it may be possible to change the pre-search results. This could be the case if the initial aggregation e.g. the time band aggregation is performed dividing all call events into two different time bands and the user would like to have a further time band. To add a further time band requires at least partly a new initial aggregation going through all call events again, now dividing all call events into three time bands. This has to be done before the user, via the additional tariff plan aggregation real time, can analyze the effect e.g. in revenue, of being able to charge subscribers based on three time bands instead of two.

Compared to the initial aggregations the additional tariff aggregation is considered as dynamic, because when an origination zone is defined and a price for a call event made from a country included in the origination zone is provided to the present invention e.g. the revenue is displayed real time to the user. If then the user determines to modify e.g. by means of adding further countries to the origination zone the revenue is again calculated and displayed real time to the user. This real time displaying of e.g. revenue is possible because the additional tariff aggregation is made based on the initial aggregations.

The rules or frames of the initial aggregation are decided by the user or the developer of the present invention. If these rules or frames are changed a new initial aggregation has to be performed or at least parts of the initial aggregation have to be done once again.

The call-related data represents historical information of call events made for a given period of time. It may be very valuable to be able to modify or perform additions to these call-related data. The analysis may be performed in relation to one data processor and then the modification or additions to the analysis results or call-related data may be performed in relation to a second data processor independent of the first data processor.

The following is a simplified example which illustrates the interaction between the aggregations and the in- and output module illustrated in FIG. 8. If a Danish network operator would like to know the revenue and costs of all voice call events on the public mobile network operated by a German roaming partner the last 12 months, it is assumed that all relevant call-related data from the German roaming partner is provided to the Danish network operator as described in relation to FIG. 7. The call-related data is then stored in the database DB and filtered as described elsewhere in this document.

Now having the records RE comprising all billing relevant call-related data from the German roaming partner, the records RE are then aggregated so that e.g.:

The base aggregation table BA comprises for each of the 12 months the total number of voice call events to the German roaming partner.

The time band aggregation table TB comprises a separation of all voice call events to the German roaming partner into e.g. three time bands.

The key figure aggregation table KE comprises the total duration of all voice call events to the German roaming partner.

The analysis aggregation table AN comprises the roaming partner cost related to how much data traffic the Danish subscribers are using the German roaming partner's public mobile network for.

The Danish network operator then configures the tariff plan aggregation (also referred to as additional aggregation) with one origination zone comprising the German roaming partner and the tariff plan aggregation is automatically executed.

The execution of the tariff aggregation is simply lookups in the different aggregation tables or pre-search results PSR to find the needed data and e.g. add a cost per duration or a percentage increase in data traffic to the pre-search results and to present it via the output module OM.

If the Danish network operator would like to see the revenue if his subscribers increased their usage of data traffic from or to this German roaming partner with 10%, this is simply entered via the input module IM and since the tariff aggregation is dynamic it is made real time and the user is instantly presented to the result.

Without the aggregation tables or pre-search results PSR the system would have to run through the whole content of the database DB comprising call-related data from all other subscribers which have made call events through roaming partners' public mobile network. This would require going through call-related data from each individual call event, first to find those from Germany, then from this specific roaming partner, then find the voice calls. Consequently, this method is fare more time consuming than by using an embodiment of the present invention. Then if a 10% increase of data traffic should be added, this would also have to be done to each individual call event compared to an embodiment of the present invention where this addition only takes place a few times.

FIGS. 7 and 8 illustrate that the data flow is going from the query application QP to the call detail record representation CDRR and back. In fact the data flow is only going from the call detail record representation CDRR to the query application QP. The arrow from the query application to the call detail record representation CDDR only illustrates that the additional aggregation, in this case the tariff plan aggregation, is looking at the pre-search results PSR comprised in the call detail record representation CDRR.

In an embodiment of the present invention, where the user would care to get simulations results which requires data which is not supported in the aggregation tables or pre-search results PSR, the query application would have to get information from the database DB or other storage containing call-related data. Then the simulation would not be done as fast as in the preferred embodiment of the invention.

In an embodiment of the invention, not all the aggregations illustrated in FIG. 8 are used and further additional aggregations are added to the present invention.

Another way of looking at an embodiment of the present invention is that the present invention creates a model or emulates real historical data traffic or call-related data e.g. from a telecommunication network. This model may then be the basis of analyzing or simulating the effect of changing some parameters in the model of the data traffic.

FIG. 9 illustrates a further explanation of an embodiment of the present invention, where a plurality of call events CE has been provided. The user of the system determines the frame of e.g. the base aggregation, such frame could be zoning of countries, definition of network operators, etc.

The result of a base aggregation PSR1 may be divided into sub-results such as the illustrated PSR1$a$ and PSR1$b$ sub-results of the same base aggregation. A simple explanation of the base aggregation is that call events e.g. having destination country or destination network operator in common are counted and presented as a sub-result of the base aggregation. In this figure two sub-results or counting of call events are illustrated as PSR1$a$ and PSR1$b$, but of course many more sub-results may be provided.

As can be seen from FIG. 9 the same call event e.g. CEn may be counted in, in more than one sub-result e.g. because this call event is made to the same network operator in the same country. In this case these call events would be counted in, in both the sub-result presenting the number of calls to that specific country e.g. PSR1$a$ and in the sub-result presenting the number of call events to that specific network operator e.g. PSR1$b$. Furthermore, it is illustrated that one call event may occur in more than one pre-search result PSR e.g. CEm.

Likewise with PSR2$a$ and PSR2$b$ which illustrate sub-results of a time band aggregation, the user defines a frame such as different time bands preferably two or three time bands in 24 hours, but more may also be defined. All call events made within each time band is then counted and presented as sub-results PSR1$a$ (e.g. call events made from 8am to 8 pm) and PSR2$b$ (e.g. call events made from 8 pm to 8 am) of the result of the time band aggregation PSR2

If the user decides to change the frames of the aggregations all call events CE have to be analyzed again to be able reflect the changes. In an embodiment of the invention, not all changes in the frame of the aggregations lead to a complete new analysis of all call events.

Interactions between the tariff plan aggregation TA and input from the user and the sub-results of pre-search result PSR1 and PSR2 are used to facilitate real time response to input from the user. Of course the present invention does not need to have real time input from the user, but may be adapted to specific analysis in advance.

In the example illustrated in FIG. 9 the sub-result PSR1$b$ counts 300 call events and the sub-result PSR2$b$ counts 400 call events. If the user wishes to analyze the effect of raising the tariff of call events made between 8 pm and 8 am, the user e.g. inputs this via the user interface comprised in the input module IM and the tariff aggregation TA retrieves the sub-result PSR2b and multiply with the new requested tariff and present a result to the user e.g. by means of the output module OM. This can only be done real time because the pre-search result PSR2b was available to the tariff plan aggregation. If the tariff plan aggregation TA would have to go through all call events CE which may count several hundred thousand call events to find the ones made between 8 pm and 8 am and then multiply with the requested new tariff, it would be a more time-consuming calculation.

There are almost an infinite number of different combinations of aggregating the call events including aggregating the pre-search results—an additional aggregation of the result of the initial aggregation. An example of aggregating results of aggregation could be where it was interesting to know the number of call events to a specific country in a specific time band. Then, with reference to FIG. 9, e.g. the sub-result PSR1b would have to be time band aggregated to divide the call events to this specific country into time bands. Such additional initial aggregation of results of initial aggregations may be performed in an embodiment of the invention.

FIG. 10 illustrates a laptop LA, server SE and a personal computer PC which is only an example of apparatus adapted for implementing the present invention. Furthermore, FIG. 10 illustrates a data network DN such as e.g. the internet which in an embodiment of the invention provides the present invention with call-related data. The call-related data may also be transferred from e.g. the computer comprising the call-related data to a computer comprising the present invention by any portable media such as a CD or DVD, USB device, etc. The call-related data may in an embodiment of the invention be placed on a server SE remote from the computer which comprises the present invention; hence, this computer downloads from the server SE the needed call-related data. Of course all possible combinations of data processing units including the three mentioned can be used.

The received data may be stored in a database in relation to a data processor capable of processing the data. In an embodiment of the invention, the analysis may be performed in relation to a first data processor and then transferred to a second data processor where the results or further analysis of the results may be performed. Such transfer of data to a second data processor, e.g. in the same or remote location such as another country, may be performed e.g. by means of a network or any portable media.

The call-related data may e.g. be downloaded on a laptop LA via a wireless or wired connection and then the laptop LA may be used in an external location to run analyses from the present invention as described above.

The user may in one embodiment of the invention e.g. use a mouse MO, keyboard KB or touch screen (not shown) or any similar device to input data to the system. Furthermore, data may come from other applications. Data may e.g. be inputted on a personal computer PC and via the data network DN distributed to other data processing devices such as e.g. a server SE, other personal computer including a laptop LA, etc.

The user may in one embodiment of the invention e.g. be presented to results from the present invention e.g. from a screen SK, projector (not shown) or any other visual and/or audio presentation means such as a speaker SP. A visual presentation could in an embodiment of the invention e.g. be a hard copy from a printer PR or stored on a portable media such as a memory stick or CD, DVD or other further developments.

Furthermore, the results may be stored in e.g. a database in a memory or storing device in a personal computer PC or other locations via the data network DN. The present invention may in one embodiment comprise features from a combination of the FIGS. 1 to 10, the description and any of the claims.

Furthermore, it is obvious to a person skilled in the art that the present invention may be used in relation to further embodiments than described throughout this document Furthermore, the embodiments disclosed in this document and all further embodiments may relate to inbound roaming as well as outbound roaming.

| | |
|---|---|
| 3GPP | Third Generation Partnership Project |
| 3GSM | Third Generation Global System for Mobile communication |
| AG | Aggregation |
| AAG | Additional Aggregation |
| AN | Analysis Aggregation Table |
| APN | Access Point Name |
| BA | Base Aggregation Table |
| BID | Billing Identifier |
| BS | Base Station |
| CDMA | Code Division Multiple Access |
| CDR | Call Detail Record |
| CDRR | Call Detail Record Representation |
| CE | Call Event |
| CIBER | Cellular Intercarrier Billing Exchange Roamer |
| CRD | Call Related Data |
| CSV | Comma-Separated Values |
| DB | Database |
| DCH | Data Clearing House |
| DN | Data Network |
| ETSI | European Telecommunications Standards Institute |
| FCDR | Filtered Call Detail Records |
| FI | Filter |
| FNT | Fixed Network Telephone |
| GSM | Global System for Mobile communication |
| GPRS | General Packet Radio Service |
| HPMN | Home Public Mobile Network |
| IM | Input Module |
| IMF | International Monetary Fund |
| IMSI | International Mobile Subscriber Identity |
| KB | Keyboard |
| KE | Key Figure Aggregation Table |
| LA | Laptop |
| MD | Mobile Device |
| MSC | Mobile Switch Center |
| MO | Mouse |
| MT | Mobile Telephone |
| NO | Network Operator |
| OM | Output Module |
| PC | Personal Computer |
| PDA | Personal Digital Assistant |
| PMN | Public Mobile Network |
| PR | Printer |
| PSR | Pre-search Result |
| QP | Query Application |
| RE | Record |
| RES | Result of an Additional Aggregation |
| RP | Roaming Partners |
| SC | Screen |
| SE | Server |
| SDR | Special Drawing Right |
| SMS | Short Message Service |
| SP | Speaker |
| SQL | Structured Query Language |
| TA | Tariff Aggregation Table |
| TAP | Transferred Account Procedure |
| TB | Time Band Aggregation Table |
| TF | Transfer File |
| TN | Telecommunication Network |
| TXT | A filename extension for a text file |
| UMTS | Universal Mobile Telephone System |
| USSD | Unstructured Supplementary Service Data |
| VPMN | Visited Public Mobile Network |
| XLM | Extensible Mark-up Language |

The invention claimed is:

1. Method of analyzing data traffic in at least one telecommunication network, said method comprising the steps of:
achieving a plurality of call detail records related to said data traffic in said at least one telecommunication network, each of the call detail records comprising call information including a called number,
aggregating the plurality of call detail records into a call detail record representation comprising at least one pre-search result and storing said call detail record representation in a database, wherein said at least one pre-search result represents data from a plurality of call detail records from different call events and the call detail record representation represents a reduction of data in the plurality of call detail records, and
performing an analysis of said data traffic by means of a query in said call detail record representation, wherein the analysis uses a reduced amount of call related data compared to the plurality of call detail records.

2. Method according to claim 1, wherein said aggregation is performed on the basis of a subset of fields of said call detail records.

3. Method according to claim 1, wherein said aggregation is performed on the basis of a subset of fields represented in a transfer file.

4. Method according to claim 1 wherein said method can be used separately or in connection with the existing systems.

5. Method according to claim 1, wherein said aggregation forms a model of the data traffic in at least one telecommunication network.

6. Method according to claim 1, wherein said analysis is performed on data traffic between at least two different telecommunication networks.

7. Method according to claim 1, wherein said aggregation forms a model of the data traffic in at least one telecommunication network and wherein said model may be modified.

8. Method according to claim 1, wherein the results of a query are presented to the user real time.

9. Method according to claim 1, wherein the user of the method may input data to be utilized for said query.

10. Method according to claim 1, wherein a pre-search comprises filtering of call-related data from the call detail record of a transfer file.

11. Method according to claim 1, wherein said aggregation is a tariff plan aggregation.

12. Method according to claim 1, wherein the result of said aggregations is pre-search results, and
wherein said pre-search results are further aggregated.

13. Method according to claim 1, wherein the result of said aggregations is pre-search results, and wherein said pre-search results in combination with further aggregation(s) and/or input from a user delivers an output to the user.

14. Method according to claim 1, wherein said aggregation includes the duration of a call event.

15. Method according to claim 1, wherein said aggregation includes the origination of at least one call event.

16. Method according to claim 1, wherein said aggregation includes the destination of at least one call event.

17. Method according to claim 1, wherein the method is computer-implemented.

18. Method according to claim 1, wherein at least a part of the pre-search results is displayed to a user.

19. Method according to claim 1, wherein the result of a query is displayed to the user by means of numbers, charts, graphs, maps or any other visual displaying effects.

20. An analysis tool implemented on a computer for performing the method of claim 1, said computer comprising a data processing circuitry and associated data memory circuitry.

* * * * *